US008849629B2

(12) United States Patent
Brown et al.

(10) Patent No.: US 8,849,629 B2
(45) Date of Patent: Sep. 30, 2014

(54) AUTOMATED ANTENNA BUILDER

(75) Inventors: Kenneth Joseph Brown, Carson City, NV (US); Ryan James Orsi, San Diego, CA (US)

(73) Assignee: Dockon AG, Zurich (CH)

( * ) Notice: Subject to any disclaimer, the term of this patent is extended or adjusted under 35 U.S.C. 154(b) by 235 days.

(21) Appl. No.: 13/234,053

(22) Filed: Sep. 15, 2011

(65) Prior Publication Data

US 2012/0065945 A1 Mar. 15, 2012

Related U.S. Application Data

(60) Provisional application No. 61/383,308, filed on Sep. 15, 2010.

(51) Int. Cl.
*G06G 7/48* (2006.01)
*G06F 17/50* (2006.01)
*H01Q 1/00* (2006.01)

(52) U.S. Cl.
CPC ........................................ *H01Q 1/00* (2013.01)
USPC ........................................ 703/4; 703/13; 703/1

(58) Field of Classification Search
USPC ................................................ 703/1, 6, 4, 13
See application file for complete search history.

(56) References Cited

U.S. PATENT DOCUMENTS

| | | | | |
|---|---|---|---|---|
| 5,719,794 | A * | 2/1998 | Altshuler et al. | 703/1 |
| 6,323,809 | B1 * | 11/2001 | Maloney et al. | 343/700 MS |
| 8,622,885 | B2 * | 1/2014 | Mersky | 600/25 |
| 2003/0229861 | A1 | 12/2003 | Quigley et al. | |
| 2009/0164954 | A1 * | 6/2009 | Yamagajo et al. | 716/2 |
| 2009/0243943 | A1 * | 10/2009 | Mumbru et al. | 343/702 |
| 2012/0065946 | A1 * | 3/2012 | Brown et al. | 703/1 |

FOREIGN PATENT DOCUMENTS

| | | | |
|---|---|---|---|
| EP | 1528626 | A2 | 5/2005 |
| EP | 2073307 | A1 | 6/2009 |

OTHER PUBLICATIONS

Delgado et al., A novel neural network for the synthesis of antennas and microwave devices, Nov. 2005, IEEE Transactions On Neural Networks, vol. 16, No. 6, pp. 1590-1600.*
Gronum Smith, Using Antenna Magus together with FEKO, May 8, 2009, EM Software & Systems—SA (Pty), pp. 1-8.*
Wittenburg et al., Visualizing Antenna Design Spaces, May 2008, ACM Press, International Working Conference on Advanced Visual Interfaces (AVI), pp. 83-90.*
Antenna Magus, http://www.antennamagus.com, available as of at least May 13, 2009.

(Continued)

*Primary Examiner* — Kamini S Shah
*Assistant Examiner* — Juan Ochoa
(74) *Attorney, Agent, or Firm* — Baker & Hostetler LLP

(57) ABSTRACT

Embodiments are directed to an antenna builder and a method of building and maintaining an antenna design repository. A first embodiment consists of an antenna builder that enables the creation of an antenna representation that can subsequently be output into a plurality of formats to be used by other tools, such as electromagnetic simulation software. An alternative embodiment is directed to a method of building and maintaining a repository of antenna designs. The repository of antenna designs can be queried, enabling a plurality of users to search for specific antenna designs. Alternative embodiments can enable a user to search the repository antenna designs by visually browsing over the antenna designs in the repository. The repository of antenna designs is created by saving solutions generated by an optimizer during an optimization run to the repository. Solutions from the repository can also be used to seed and bootstrap other optimization runs.

22 Claims, 16 Drawing Sheets

(56) References Cited

OTHER PUBLICATIONS

Computer Simulation Technology, http://www.cst.com, available as of at least Dec. 20, 1996.

Magus (PTY) Ltd, “AntennaMagus—The first antenna design tool of its kind”, Brochure, May 26, 2009, XP55015954, Stellenbosch, South Africa.

Antennamagus—User Manual, Version 2.1.0, Jun. 1, 2010, pp. 1, 9-26, www.antennamagus.com/release-notes.php.

* cited by examiner

```
SETVERSION,3.1,CPL Builder,1.0.404.10280,7/6/2011 1:07:32 PM

SETLAYER,TOP LAYER,0

SETMATERIAL,PEC

POLYGON,CPL_Loop,0.01,0,0,0,1,0,1,1,-1,1,-1,0,0,0

SETLAYER,PCB LAYER,0

SETMATERIAL,FR-4 (lossy)

POLYGON,PCB,-1,-0.031,1.055,1.055,-1.055,1.055,-1.055,-0.055,1.055,-0.055
```

FIG. 5

Report Generated: 8/15/2011 2:35:49 PM

008.AZW-RevMA9
Solve Date: 08/15/2011 10:47:53 AM
Solve Error: False

Farfield Results (3)

Farfields\farfield (f=2.45) [1]\Abs
Frequency: 2.45
Radiation Efficiency: -2.006
Total Efficiency: -7.168
Directivity: -0.773
Farfields\farfield (broadband) [1]\Abs
Frequency: 1.5
Radiation Efficiency: -1.994
Directivity: -0.767
Farfields\farfield (f=1.5) [1]\Abs
Frequency: 1.5
Radiation Efficiency: -0.169
Total Efficiency: -2.346
Directivity: 2.253

Q Values (1)

2.055 GHz
Amplitude: -31.739
Q Factor: 2.594

1D Results (11)

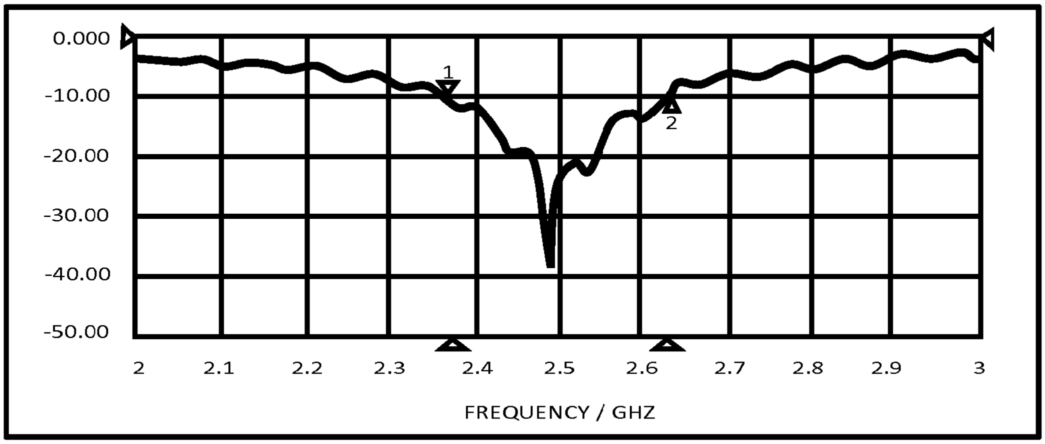

FIG. 10A

Farfields

Parameters (17)

Loop_Trace_Width: 0.1
Loop_Length: 2
Segment_Name_4: 0.7
Segment_Name_2_Rad_1_Radiator_width: 0.03
Segment_Name_2_Rad_1_Radiator_length: 0.2
Segment_Name_2_Rad_1_Segment_offset: 0
Segment_Name_2_Rad_1_offset: 0
Segment_Name_2: 0.7
Segment_Name_1: 0.5
RadOffset: 0.25
RadWidth: 0.1
Radlength: 0.3

AUTOMATED ANTENNA BUILDER

CROSS-REFERENCES TO RELATED APPLICATIONS

This application claims priority to U.S. Provisional Application for Patent No. 61/383,308, filed Sep. 15, 2010, which is incorporated herein by reference.

BRIEF DESCRIPTION

Embodiments are directed to a computer-implemented automated antenna builder, a computer-implemented method for automated antenna generation, and a computer-implemented method of building and maintaining an antenna design repository. Embodiments of the antenna builder enable a user to create an antenna by creating one or more antenna segments making up the antenna, and associating properties and logic to the one or more antenna segments. A user of the antenna builder can manually assign properties and logic to the one or more antenna segments, or the antenna builder can automatically assign properties and logic to the one or more antenna segments based on the type of antenna being created by the user. The created antenna can subsequently be output to a plurality of formats that can be read by third party applications, such as electromagnetic simulation software and manufacturing devices. The antenna builder can also incorporate a simulation engine enabling a user to create and test antenna designs without leaving the antenna builder interface. The antenna builder may additionally incorporate an optimizer that tunes and improves an initially created antenna design.

Yet another embodiment is directed to a computer-implemented method of building and maintaining a repository of antenna designs. The repository of antenna designs is continuously populated with antenna designs created with the antenna builder, with third party applications, or created by an optimizer during an optimization run. The repository of antenna designs enables users to perform search queries or to browse the repository using predefined search criteria or by visually browsing antenna designs. The repository of antenna designs enables users who are not antenna engineers, and who have no experience regarding antenna design, to find antenna designs that meet a set of conditions or user requirements. If an antenna design meeting the set of conditions is not found, then alternative antenna designs from the repository can be displayed as suggestions for the user. In addition, the user can submit a job request that accepts the set of conditions, and performs an optimization run that creates an antenna design that best meets the set of conditions. The optimization run can be seeded with randomly created antenna designs, seeded with antenna designs from the repository, or with a combination of randomly created antenna designs and antenna designs from the repository.

Yet another embodiment is directed to a computer-implemented automated method of automated antenna generation. The method enables a user to specify a set of requirements for an antenna. As part of the requirements provided, the user can upload CAD/3D model data or PCB drawing data, indicating an outline of the area where the actual antenna is to fit. The automated antenna generation analyzes the available area or volume and generates and optimizes the best antenna that meets the requirements provided. The set of requirements can include material requirements, electrical requirements, and electromagnetic requirements.

STATEMENTS AS TO THE RIGHTS TO INVENTIONS MADE UNDER FEDERALLY SPONSORED RESEARCH OR DEVELOPMENT

Not applicable.

REFERENCE TO A “SEQUENCE LISTING,” A TABLE, OR A COMPUTER PROGRAM LISTING APPENDIX SUBMITTED ON A COMPACT DISK.

Not applicable.

BACKGROUND 3D modelers are used in a wide variety of industries, such as the medical industry, the movie industry, the video game industry, the architecture industry, and the science sector. 3D modeling tools are especially useful in engineering applications for the design of new devices and structures. In the case of antenna design, electromagnetic simulation software programs typically include a 3D modeling tool to enable users to create antenna designs.

3D modeling tools have high learning curves due to the complex and large arrangement of controls and options, many of which can be obscure to users without any 3D modeling experience. For example, 3D modeling tools require management of the camera and the viewpoint of the object(s) being drawn. The problem is further compounded in electromagnetic simulation tools, where users deal with both the assembly of an antenna structure using 3D geometric primitives, but must also do so in accordance to principles of antenna engineering.

When creating a 3D antenna structure in an electromagnetic simulation program, the user assembles the antenna structure using building blocks, such as bricks or polygons, that have no logic or properties that reflect its purpose of functionality. For instance, in the case of a compound loop (CPL) antenna, if a user draws a rectangular brick to represent an electric field radiator, then this is represented by the 3D modeling tool simply as a 3D rectangular object without any properties or logic corresponding to an electric field radiator.

This discussion has also assumed that a user creating an antenna design already has the necessary knowledge to actually build an antenna. Antenna design varies depending on the type of antenna architecture being created, and many times it is only an expert user who has sufficient knowledge for actually creating an antenna design that meets efficiency and other specified requirements. Thus, if a user has no antenna design expertise, then the user faces the challenge of both learning how to use the electromagnetic simulation tool, how to create an antenna design using a 3D modeling tool, and how to arrange elements to create an actual antenna.

BRIEF DESCRIPTION OF THE SEVERAL VIEWS OF THE DRAWING

FIG. 5 illustrates an embodiment of text based commands used as an intermediate language to represent the drawing data for an antenna, with the drawing data decoupled from the properties and logic of the antenna segments;

FIGS. 10A and 10B illustrate the report page associated with antenna designs stored in the antenna repository in accordance with an embodiment.

DETAILED DESCRIPTION

Figure 1:
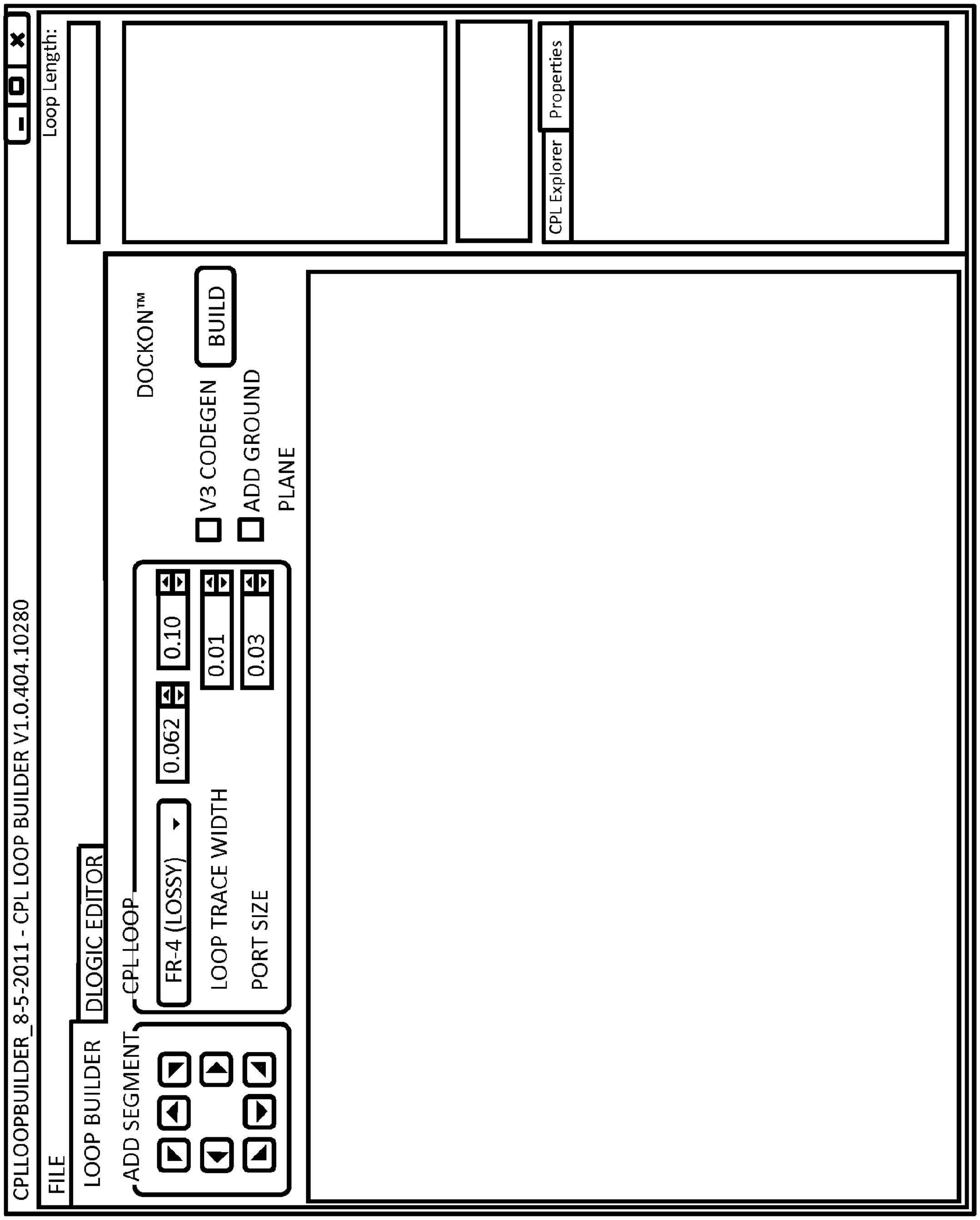
FIG. 1 illustrates the interface of the antenna builder in accordance with an embodiment.

Embodiments are directed to a computer-implemented automated antenna builder, a computer-implemented method for automated antenna generation, and a computer-implemented method of building and maintaining an antenna design repository. Embodiments of the antenna builder enable a user to create an antenna by creating one or more antenna segments making up the antenna, and associating properties and logic to the one or more antenna segments. A user of the antenna builder can manually assign properties and logic to the one or more antenna segments, or the antenna builder can automatically assign properties and logic to the one or more antenna segments based on the type of antenna being created by the user. The created antenna can subsequently be output to a plurality of formats that can be read by third party applications, such as electromagnetic simulation software and manufacturing devices. The antenna builder can also incorporate a simulation engine enabling a user to create and test antenna designs without leaving the antenna builder interface. The antenna builder may additionally incorporate an optimizer that tunes and improves an initially created antenna design.

Yet another embodiment is directed to a computer-implemented method of building and maintaining a repository of antenna designs. The repository of antenna designs is continuously populated with antenna designs created with the antenna builder, with third party applications, or created by an optimizer during an optimization run. The repository of antenna designs enables users to perform search queries or to browse the repository using various search criteria or by visually browsing antenna designs. The repository of antenna designs enables users who are not antenna engineers, and those who have no experience regarding antenna design, to find antenna designs that meet a set of requirements. If an antenna design meeting the set of requirements is not found, then alternative antenna designs from the repository can be displayed as suggestions for the user. In addition, the user can submit a job request that accepts the set of requirements, and performs an optimization run that creates an antenna design that best meets the set of requirements. The optimization run can be seeded with randomly created antenna designs, seeded with antenna designs from the repository, or seeded with a combination of randomly created antenna designs and antenna designs from the repository.

Yet another embodiment is directed to a computer-implemented automated method of automated antenna generation. The method enables a user to specify a set of requirements for an antenna. As part of the requirements provided, the user can upload CAD/3D model data or PCB drawing data, indicating an outline of the area where the actual antenna is to fit. The automated antenna generation analyzes the available area or volume and generates and optimizes the best antenna that meets the requirements provided. The set of requirements can include material requirements, electrical requirements, and electromagnetic requirements.

Embodiments of the antenna builder enable a user to construct an antenna by using antenna segments. The antenna segments consist of structures and objects that are architecture-specific, rather than simply being geometric primitives that have no relation to antennas or to the antenna architecture being built by the user. The antenna builder supports the manual creation of antenna designs and the automatic creation of antenna designs based on a set of requirements provided by a user. For instance, rather than manually creating an antenna by arranging antenna segments and defining their relationships, the user may only specify the overall size of the antenna, the desired antenna frequency (or frequencies in the case of a multi-band antenna), the desired radiation pattern, the substrate properties, etc. Based on these properties and antenna requirements, the antenna builder can generate an initial design or perform an optimizing run that explores antenna designs that meet the specified properties and antenna requirements.

As an example, in the case of creating a compound loop (CPL) antenna, the antenna segments used to create an antenna design include properties and logic associated with compound loop antennas. For instance, creating an electric field radiator segment creates a graphical object, that in addition to drawing data also has properties associated with an electric field radiator; such as a frequency of operation, a length, the connection point for the electric field radiator, emittance of an electric field, etc. Logic associated with the electric field radiator can specify that the electric field radiator cannot be too long so as to capacitively couple with portions of the magnetic loop or with other segments or elements of the antenna. The logic can also specify that the electric field radiator is to be positioned at the 90/270 degree connection point or at the point where current flowing through the magnetic loop is at a reflective minimum. Thus, the logic and properties of antenna segments enables expert knowledge of antenna design to be associated with each antenna segment, rather than simply having geometric primitives without relevant antenna design logic.

In further reference to the CPL example introduced above, creating an electric field radiator in an electromagnetic simulation program is performed by creating a discrete 2D/3D rectangular object without any relations to any other 2D/3D object that has been previously drawn or to any other object that will be drawn. Thus, a user manipulates geometric objects without any logic associated with them, and with the only properties of these geometric objects being a list of vertices, size, location, etc. In contrast, embodiments of the antenna builder provide a smart building environment that allows a user to manipulate geometric objects having properties and logic defining architecture specific information of each object and defining relationships between different objects. In the case of a CPL antenna, logic can indicate that a counterpoise is to be positioned approximately 180 degrees from the location of the electric field radiator.

In the antenna builder, a user can first create an antenna structure using geometric objects, with the user adding properties and logic to each geometric object after the antenna structure has been drawn. For instance, the user may first draw a 3D rectangle, and at a later point the user may identify the 3D rectangle as an electric field radiator. Alternatively, the user can build the antenna structure by using antenna segments which already have properties and logic associated with them. For example, the user can draw an electric field radiator by selecting the electric field radiator geometric object from a list of antenna segment drawing objects.

The logic and attributes of antenna segments can be tracked using various methods. In a first embodiment, antenna segments include a tag identifying the type of the antenna segment. The type of the antenna segment then determines a set of properties and logic maintained by a drawing canvas, a drawing kernel, a drawing entity, or some other entity that manages the antenna structure. The logic and properties can be stored in a database, in a file, or in memory. For instance, in the case of a CPL antenna, if a user drew a magnetic loop and an electric field radiator, then the managing entity would draw a first object having a magnetic loop tag and a second object with an electric field radiator tag.

In embodiments described herein, the logic and properties of antenna segments can be maintained entirely in the antenna segment, with minimal management by a managing entity. Alternatively, some of the logic and properties can be stored and maintained by the antenna segments and some of the other logic and properties can be stored and maintained by the managing entity. In yet another embodiment, the antenna segments can manage and track their own properties, and all of the logic associated with the antenna segments can be tracked and maintained by the managing entity. It is also possible for the antenna segments to manage only basic geometric properties, and for all of the antenna architecture specific properties and logic to be maintained by the managing entity.

Embodiments of the antenna builder can be used as a part of a design pipeline. A user can create initial antenna designs with the antenna builder, which is subsequently output to a format to be processed and analyzed by the next system in the design pipeline. For instance, after an initial antenna design is created, the output of the antenna builder can be loaded to an electromagnetic simulation program to test the antenna performance.

Embodiments of the antenna builder can operate as a standalone program or as a plug-in/add-in to third party applications. The antenna builder can also include an electromagnetic simulation engine that allows the user to view simulations, assess the performance of the antenna, and run optimization runs to explore alternative antenna designs, all within the antenna builder interface.

The antenna builder can output generated antenna designs into various formats and representations. The output representing an antenna design can be a graphical output, a numeric output, or a textual based output. For example, the antenna builder can output an image of the antenna design, with the image of the antenna design including annotations specifying the specific dimensions for each of the segments of the antenna design. The output of the antenna design can also include a report detailing all of the properties associated with each of the antenna segments. For example, in the case of a dipole antenna, the report can include the length of the antenna, the impedance of the feed line, the antenna gain, etc. The report can also include a comparison between the initial antenna design created by the user and the final antenna design after a number of revisions made by the user or by an optimizer.

The output of the antenna builder can be an intermediary format that is subsequently used by a simulation program or a manufacturing device to recreate the antenna design created by the user without requiring the user to manually construct the antenna design from scratch in the simulation program or in the manufacturing device. For example, a particular simulation tool may use XML as the internal representation used for objects, including antennas. In such a case, the antenna builder can output the antenna design using an XML representation. Alternatively, the output of the antenna builder can be instructions that can be followed by a user using a manufacturing tool to create the physical antenna design.

The methods used to format and output data from the antenna builder will vary depending on the type of data formatting and on the data format expected by other tools using the output from the antenna builder. Consequently, it is not possible or realistic to attempt to explain all such methods in this description. Moreover, it is not necessary to describe such methods herein because anyone of skill in the art of the disclosure will be able to create the needed formatting methods. However, to illustrate embodiments and a best mode, various data formats and ways of outputting data generated by the antenna builder will be described herein.

As noted above, embodiments provide the ability to save an antenna design that can subsequently be reused, modified, or saved into a different format. From herein, the use of the antenna builder in combination with the CST MICROWAVE STUDIO program will be used as an example of how embodiments of the antenna builder can be used in combination with third party programs, such as an electromagnetic simulation program. The CST MICROWAVE STUDIO program (from herein will be referred to as "CST") is a tool for 3D electromagnetic simulation of high frequency components developed by CST Computer Simulation Technology AG. It is noted that embodiments are not limited to interacting with CST.

The format of the output from the antenna builder may or may not be human readable. For example, the output from the antenna builder can be an image file, XML, YAML, CSV, raw ASCII data, raw text data, instructions or source code, serialized data, among others. In the cases where the output of the antenna builder consists of serialized data, instructions, or source code, the actual contents will vary and depend on the target programming language used, and vary and depend on the languages and runtime engine supported by the third party application reading the output of the antenna builder. For example, the output can consist of Visual Basic for Applications (VBA) source code that can be used to rebuild the antenna in an application that uses the Visual Basic Runtime engine.

Embodiments of the antenna builder enable users to build an antenna design once, and output the antenna design into a variety of data formats, including a wide variety of programming languages. As will be further described below, the antenna builder includes an interface for writing additional logic associated with an antenna design. Therefore, a user can write logic to extend the functionality of the antenna builder, such as custom outputs by the antenna builder. For example, a user can write logic to output an antenna design as a PYTHON script that can render the antenna design in an environment or application that uses PYTHON scripting. Alternatively, the user can write logic to output an antenna design as a PYTHON script that creates a stand-alone window and displays the antenna design in the window. The output can also be formatted in such a way as to enable construction of the antenna in a different environment.

In an embodiment, the output of the antenna builder for a particular antenna design consists of the geometry data and antenna logic coupled together. For example, the output can consist of the combination of the geometry of the antenna segments, the properties and logic associated with each of the antenna segments, and logic describing relationships between various antenna segments. In yet another embodiment, the output of the antenna builder can be geometric information and drawing data separated and decoupled from the properties and logic of the antenna segments.

The drawing data, logic, and properties of antenna segments can also be output from the antenna builder as an object that can be loaded by third party applications using dynamic linking or late binding. Third party applications running under the WINDOWS operating system can use a dynamic-link libraries (DLLs) and third party applications running under a Unix-like system can use dynamic shared objects (DSOs).

For example, if a user uses the builder to create a CPL antenna with one magnetic loop and two electric field radiators, then the output of the antenna builder can be a file for the drawing data and a DLL containing the properties and logic of the antenna segments. The advantage of decoupling the drawing data from the antenna architecture properties and logic is that even if a third party application does not support dynamically loaded logic, the third party application can still render the antenna design by parsing the drawing data. Decoupling the logic from the drawing data also enables the same set of logic to be used with different antennas, and it allows logic associated with an antenna architecture to be written once and shared among a plurality of users working on the same project.

As yet another example, if the user was using the builder to create a Yagi Uda antenna (from herein "Yagi antenna"), then the geometry and drawing data can consist of a list of vertices for the driven element and for the parasitic elements. The logic loaded from a DLL in association with the Yagi can indicate logic associated with the spacing between the driven element and the parasitic elements, the relative sizing of the parasitic elements in relation to the driven element, etc.

The logic and properties of antenna segments can include information that can be used by an optimizer to optimize one or more criteria of an antenna design. In the case of a CPL antenna, the logic and properties can include a range of positions of an electric field radiator, the position and possible size ranges for transitions and counterpoises, etc. The optimizer can then optimize an antenna design by exploring the various relative positions of the electric field radiator, by assessing how changing the position and sizes of the transitions and counterpoises affect the criteria being optimized, etc. In the case of a Yagi antenna, the logic and properties can include possible size ranges for the various parasitic elements and the driven element, a range of possible spacing values between the various elements of the Yagi antenna, etc. As noted above, the logic and properties of antenna segments can be set by default by the antenna builder, and they can be set and edited by a user through the antenna builder controls.

Embodiments of the antenna builder enable a user to define optimization criteria to be maximized or minimized by an optimizer operating within the antenna builder or an optimizer of a third party application. The antenna builder can also enable a user to expose parameters which can be varied by the optimizer to best meet the optimization criteria. For instance, in the case of CPL antenna, the user can specify that the optimizer can vary the position of the electric field radiator, but the optimizer cannot vary the size of the electric field radiator. The user can also specify that tuning capacitance patches can be used to tune the antenna performance, rather than changing the geometry of the magnetic loop. As a user creates the antenna structure with antenna segments, the user can set an "expose" parameter of each antenna segment to true or false, with true indicating that the parameter can be operated on by the optimizer, and false indicating that the parameter is not to be changed by the optimizer during optimization runs.

In an embodiment of the antenna builder, the user first specifies a number of high level requirements for the antenna. For instance, these requirements can include the substrate type or printed circuit board (PCB) type, the thickness of the substrate, the margin, the magnetic loop trace width, the target frequency, the minimum desired efficiency, and the port size. All of these requirements can subsequently be presented to the user with default values. The user then has the option to accept the default values or change any of the default values. For example, the user may only be interested in specifying the target frequency of the antenna and the minimum desired efficiency, while leaving all of the other parameters as default values. The meaning of these properties may depend on the type of antenna being built by the user. In the case of a CPL antenna, the margin property refers to the amount of PCB material surrounding the copper traces of the magnetic loop. The justify property refers to how a counterpoise piece is justified along the magnetic loop structure. For example, a counterpoise positioned along a vertical segment of the magnetic loop can be justified at the top, bottom, or even centered. Alternatively, a counterpoise positioned along a horizontal segment can be justified to the left, to the right, or centered.

As noted above, embodiments of the antenna builder can store the logic associated with a specific antenna architecture within a single file that can be loaded by third party applications. For example, the logic associated with CPLs can be stored in a CPL DLL, the logic associated with Yagi antennas can be stored in a Yagi DLL, and the logic associated with dipole antennas can be stored in a dipole DLL, etc. In such embodiments, the logic for all antenna segments associated with an antenna architecture would be stored within the same file. In the case of a CPL antenna, the CPL DLL can include logic for electric field radiators, magnetic loops, baluns, counterpoises, transitions, and the relationships between these antenna segments. Alternatively, the logic for an individual antenna segment can be stored within a single file. For instance, the logic associated with electric field radiators in a CPL antenna would be stored within an electric field radiator DLL, the logic associated with magnetic loops in a CPL would be stored within a magnetic loop DLL, etc. As noted above, the logic can indicate relationships between antenna segments, such as description of pin-points where antenna segments can connect with one another.

Embodiments of the antenna builder enable a user to draw an antenna structure using various methods. In a first embodiment, the user is allowed to draw the antenna by using arrow controls. The user can use the arrow keys from the keyboard as the arrow controls. Alternatively, arrow controls can be displayed on the screen to the user, allowing the user to control the arrow controls on the screen using a mouse, touch screen or keyboard. The arrow controls can include left, right, up, down, and the various diagonal controls. In the first embodiment, a cursor or some other marker is set at a start drawing location. Pressing one of the arrow controls would then automatically create an antenna segment by using the start drawing location as a first endpoint and moving the cursor or marker a certain distance along the direction selected by the user.

When using the arrow controls, the drawing tool can initially create segments of a standard width and length. Thus, regardless of the direction selected by the user or of the particular segment being drawn, the segment drawn would always be the same length. For example, if 5 centimeters was the default length and the user pressed the right arrow, then a first segment with a length of 5 centimeters would be drawn. If the user then proceeded to press the down arrow, followed by the left arrow, and finally the up arrow, a square antenna would be drawn as a result. The user can then adjust the individual length of each segment either once all of the segments have been created or after each segment is created.

In further reference to the arrow controls, embodiments of the drawing tool can also determine the length of each antenna segment based on how long the user presses the arrow button. For example, the longer the user presses the particular arrow button, the longer the resulting segment will be. In an embodiment, the last segment would automatically be completed to form a closed loop, without the user having to manually draw the last segment.

In yet another embodiment, the user can draw the antenna segments using a mouse. The user can drag the mouse along a first direction to draw the first segment, and then move the mouse along a second direction to draw the second segment, etc. In addition, the drawing tool can provide basic drawing primitives that can be used to draw antenna segments. Such drawing primitives can include circles, ellipses, rectangles, triangles, straight line segments, and curved line segments. For instance, the rectangle primitive can be used to draw a rectangular shaped antenna. A combination of straight line segments and curved line segments can also be used to create a wide variety of antenna shapes.

Once an antenna has been created using drawing primitives, the user can tag each drawing primitive as an antenna segment. In the case of a Yagi antenna, the user can tag the first segment as the driven element, and all of the other segments can be tagged as parasitic elements. In the case of a CPL antenna, for example, the user can tag one segment as a magnetic loop, another segment as an electric field radiator, etc.

The antenna builder can also provide a library of completed antenna shapes, enabling a user to quickly create an antenna design by making minor edits. The library of antenna shapes can include widely and commonly used antenna designs for various antenna architectures. For example, a user creating a CPL antenna can edit a completed antenna shape by adding a balun and a transition. In the case of a Yagi antenna, the completed antenna shapes can include Yagi antennas with one driven element and two parasitic elements, with one driven element and four parasitic elements, etc.

An alternative embodiment of the antenna builder can enable the user to draw an antenna structure by using graphical elements representing antenna components. Antenna components can be provided for various antenna architectures, including CPL antennas, Yagi antennas, dipole antennas, PIFA antennas, loop antennas, etc. For instance, antenna components for CPL antennas can include a magnetic loop shape, an electric field radiator shape, a balun shape, etc. The user can drag and drop these graphical elements into a drawing canvas, or into a 3D modeling environment, to create an antenna structure. The antenna components can also include common variations of antenna segments. In the case of a CPL antenna, common variations of an electric field radiator component can include rectangular electric field radiators, rectangular electric field radiators with corners cut off at an angle, L shaped electric field radiators, etc. After the user has selected and added an antenna component to the drawing canvas, the user can also modify the antenna component by parameters associated with the antenna component, with the geometry of the antenna component automatically updated based on the modifications to the parameters. The user can also modify the edges or vertices that make up the antenna component. After an antenna component has been modified, the user can be given the option to save the modified antenna component as a new variation of the antenna component.

In yet another embodiment, the user can create a list of the segments making up an antenna. Based on this information, the antenna builder can generate an initial antenna design. For example, a user creating a CPL antenna can create a list of segments including one magnetic loop, one electric field radiator, a counterpoise for the electric field radiator, and a balun. Using this list of segments, the builder can automatically generate an initial antenna design.

It is to be understood that regardless of how an antenna structure is created, the antenna builder can automatically determine suitable positions and connection points for antenna segments. The user can also manually specify the position and connection point for each antenna segment. The choice between the automatically calculated positions and manually specified positions can be based on the drawing mode selected by the user.

As described above, after an antenna design has been created within the antenna builder, the created antenna design can be output and read by a third party application. The third party application may be an application that can read the output of the antenna builder without a plug-in or without any data conversion. Alternatively, the third party application may read the output of the antenna builder by first converting the output of the antenna builder into a suitable format. This conversion can be done by a plug-in/add-in added to the third party application.

The antenna builder can be used as a simple construction tool, where the user performs all of the manual operations of defining and adjusting the antenna segments. For example, the user can manually draw an antenna design as described above, load the antenna design to an electromagnetic simulation program, and based on the simulated performance of the antenna design, adjust the antenna design in the builder. After the user has manually adjusted the antenna as desired, the user can load the modified antenna design to the electromagnetic simulation program, and repeat the process as necessary.

In yet another embodiment, the builder can be used to both create an initial antenna design and to optimize the initial antenna design. The optimization process can be done by a third party application, such as an electromagnetic simulation program, or it can be done by the builder itself. The builder can include a simulation and optimizer engine, or it can initiate requests to third party applications to perform a simulation and optimization run. The results of the simulation and optimization run are returned to the builder, enabling the user to perform all operations without having to switch windows or close the antenna builder.

As described herein, an optimizer attempts to maximize or minimize one or more criteria associated with an antenna design. The optimizer explores variations of a particular antenna design by making changes to one or more antenna segments or by adding additional antenna segments. The properties and logic associated with the antenna segments allow the optimizer to determine which operations are valid when making variations to antenna segments. In the case of a CPL antenna, the logic may define that an electric field radiator is to be positioned close to the area where current flowing through the magnetic loop is at a reflective minimum. This rule would keep the optimizer from moving the electric field radiator to a position away from the reflective minimum connection point. The logic may also indicate physical properties of antenna segments, such as the electric field radiator having a width of at least 2 mm and no more than 10 mm.

When specifying the parameters that are exposed to the optimizer, the user has the option to specify a value range for each of the parameters that the optimizer can explore. The set of values or range of values can be defined by manually listing all the suitable values. Alternatively, the user can define a range of valid values (and inherently a set of invalide values) by specifying a maximum value and a minimum value, with any value in between the maximum and minimum being a valid value that the optimizer can explore, and values outside of that range being invalid. Finally, when defining a range of values, the user can also specify the degree of precision for the range of values. For instance, a user can indicate that the length of the driven element in a Yagi antenna is exposed to the optimizer. If the user manually listed suitable values for the length of the driven element, then the user would provide a list of values, such as one wavelength, one half wavelength, and a quarter wavelength. Alternatively, the user could define a range of values by indicating that the length of the driven element can range from a minimum length of 5 cm to a maximum length of 500 cm. In the latter case, the user can further define the precision by indicating that any integer value between 5 cm and 500 cm can be explored by the optimizer. The user could also specify the precision by indicating that the optimizer can search any floating point value up to two significant digits between 5 cm and 500 cm, enabling the optimizer to search values including 5.05, 10.18, 100, 250.99, etc.

The properties associated with an antenna segment are dependent on the type of the antenna segment and on the particular antenna architecture being built. These properties can be defined by logic of the antenna builder, by logic defined in an external library, or by logic defined by the user. In the case of a CPL antenna, properties for electric field radiators can include the direction of the electric field radiator, the parameter(s) to be optimized (exposed parameters), the width of the radiator, the minimum and maximum values of the width, the length of the radiator, and the minimum and maximum values of the length. Properties for a counterpoise and transition can include the percentage of the magnetic loop spanned by the counterpoise or the transition, the justify, and the minimum and maximum values for the length of the counterpoise/transition. Additional properties for the transition can include whether the transition is tapered.

Figure 2:
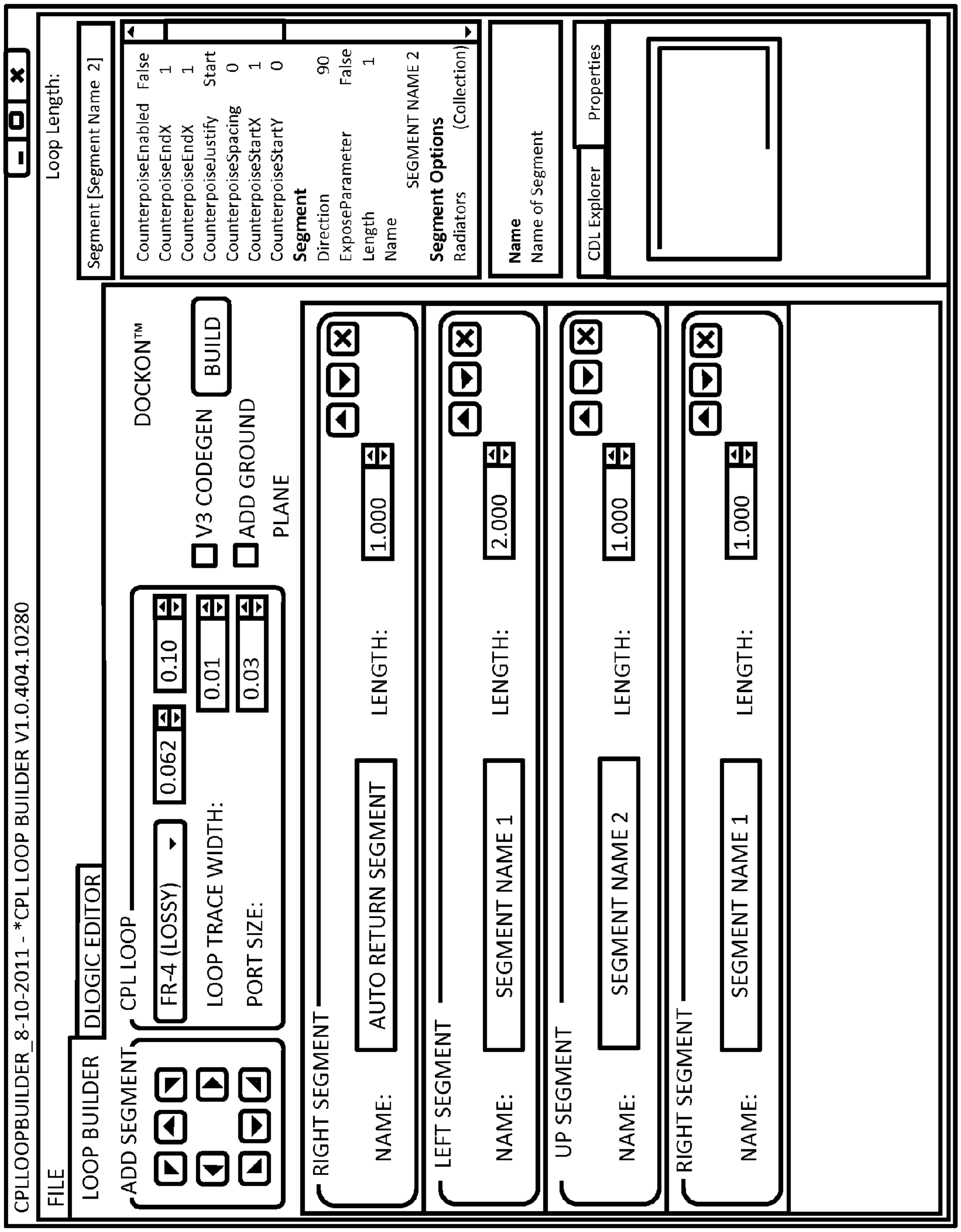
FIG. 2 illustrates the interface of the antenna builder with a compound loop antenna partially drawn by creating antenna segments.
Figure 3A:
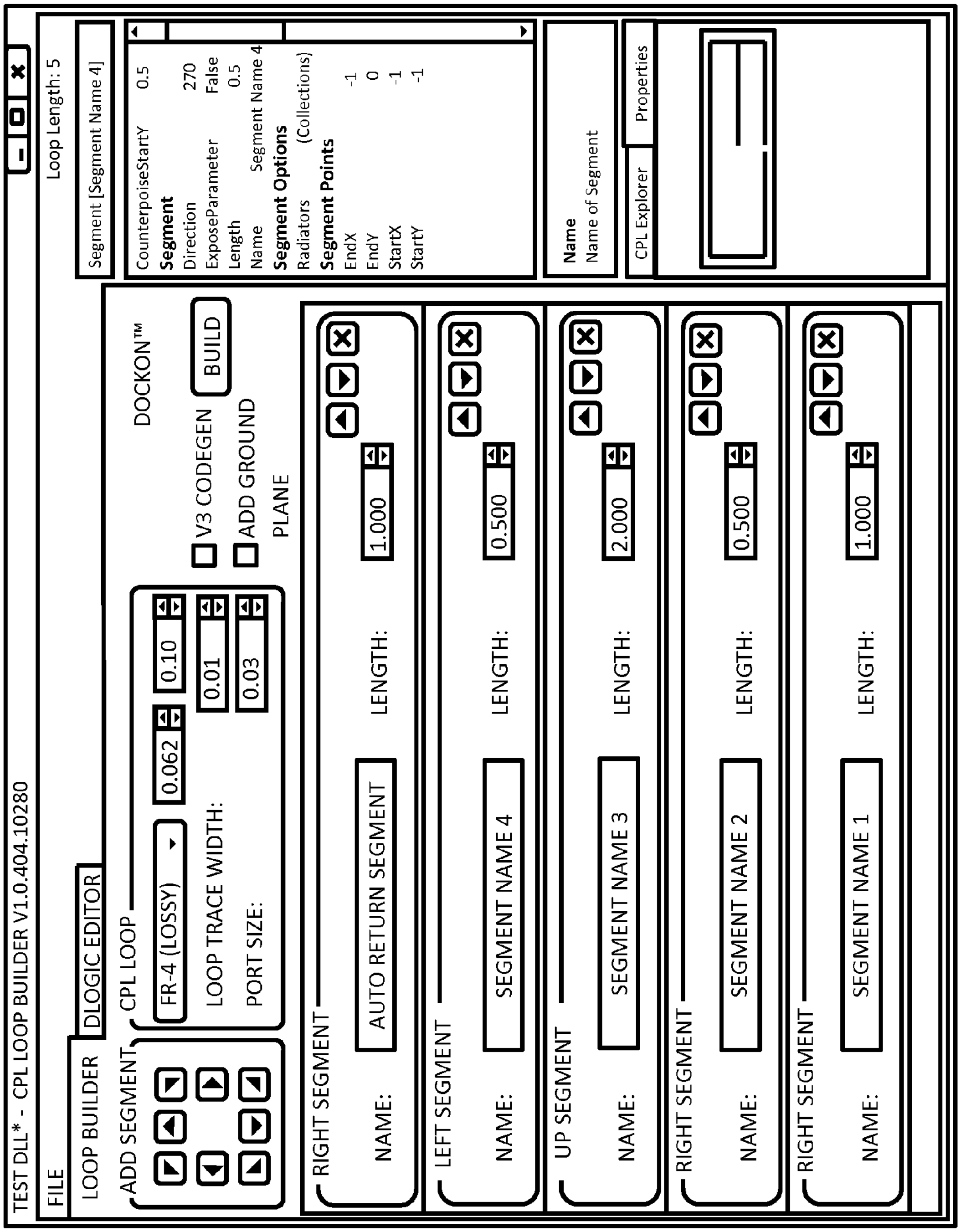
FIG. 3A illustrates the antenna from FIG. 2 completely drawn.

FIG. 1 illustrates the main interface of the antenna builder in accordance with an embodiment when the antenna builder first loads. FIG. 2 illustrates an example of a CPL antenna partially drawn. As the user creates antenna segments, the antenna segments are added to the segment list and the corresponding antenna segments are rendered on the preview screen located on the bottom right corner of the builder interface. FIG. 3A illustrates the antenna design from FIG. 2 completed.

In a particular embodiment, the interface of the antenna builder is modified depending on the type of antenna architecture that the user is building. If the user is creating a CPL antenna, then the interface of the builder would reflect this by providing subpanels and options specific to CPL antennas, such as the interface illustrated in FIG. 1. The antenna builder can also be configured to display a dialog that asks the user to select the type of antenna architecture that the user will be working on. The user can be provided with a list of antenna architectures, such as CPL antenna, Yagi antenna, loop antenna, dipole antenna, PIFA antenna, etc. After the user selects one of the antenna architectures, the antenna builder can update its interface to display appropriate menu options and other widgets corresponding to the selected antenna architecture. The antenna builder can also allow a user to load an antenna design, and based on the type of the antenna being loaded, determine the type of interface and options to display. The antenna builder can also provide a generic interface, with the options associated with different antenna architectures displayed in different panels or menus. FIGS. 1-3 illustrate an embodiment of the antenna builder displaying options associated with the CPL architecture. The CPL specific options include the "CPL Loop" subpanel, the "Add Ground Plane" option and the "CPL Explorer" panel on the bottom right corner of the builder, among others.

Returning to the description of FIG. 1, the antenna builder interface includes a "Loop Builder" tab (from herein "the builder tab") and a "dLogic Editor" tab (from herein "the dlogic tab"). The dlogic tab is further described in reference to FIG. 4A. The builder tab provides the user with options and controls to draw an initial antenna design or to edit existing and previously saved antenna designs. Methods for drawing antenna designs with the builder interface were described above.

The top of the builder tab includes the "Add Segment" subpanel and the "CFL Loop" subpanel. The "Add Segment" subpanel includes arrow controls that are used to create antenna segments. If the user presses the up arrow, then an antenna segment is created by drawing a line from the current drawing position to a position that is located above (up) from the current drawing position, thus drawing an up segment. As previously described, the antenna builder provides many controls for drawing antenna segments. The CPL Loop subpanel displays general and high level settings related to the magnetic loop. The dropdown list allows the user to select one of many substrates to use for the antenna. In the example illustrated in FIG. 1, FR-4 is selected as the substrate. The two textboxes next to the substrate dropdown menu are used to specify the minimum and the maximum thickness of the dielectric used. The two textboxes underneath the dielectric dropdown menu allow the user to specify the loop trace width and the port size. The "Add Ground Plane" checkbox instructs the builder to add a ground plane to the antenna design, or to remove the ground plane by unselecting the checkbox, thus allowing the user to create both single-sided and double-sided CPL antennas.

As antenna segments are created, they are added to a list of segments. For each antenna segment, the name and the length of the segment can be edited by the user. The up and down arrows allow a segment to be moved up or down the segment list, thereby changing the structure of the antenna. A segment can also be deleted by clicking on the button with the "X" mark of each respective segment. When a segment is deleted, the two adjoining segments are connected to each other. For example, if a middle segment, between a first segment and a second segment, is deleted, then the first segment will be connected to the second segment. Alternatively, the midpoint between the first segment and the second segment can be calculated, with the first segment and the second segment elongated correspondingly to meet at the calculated mid-point. Additional settings and properties associated with a particular segment are displayed on the properties panels to the right of the list of segments. As a new antenna segment is drawn, it is automatically added to the segment list. The user has the option of editing each segment as it is drawn or editing one or more segments after all of the segments are drawn.

Figure 3B:
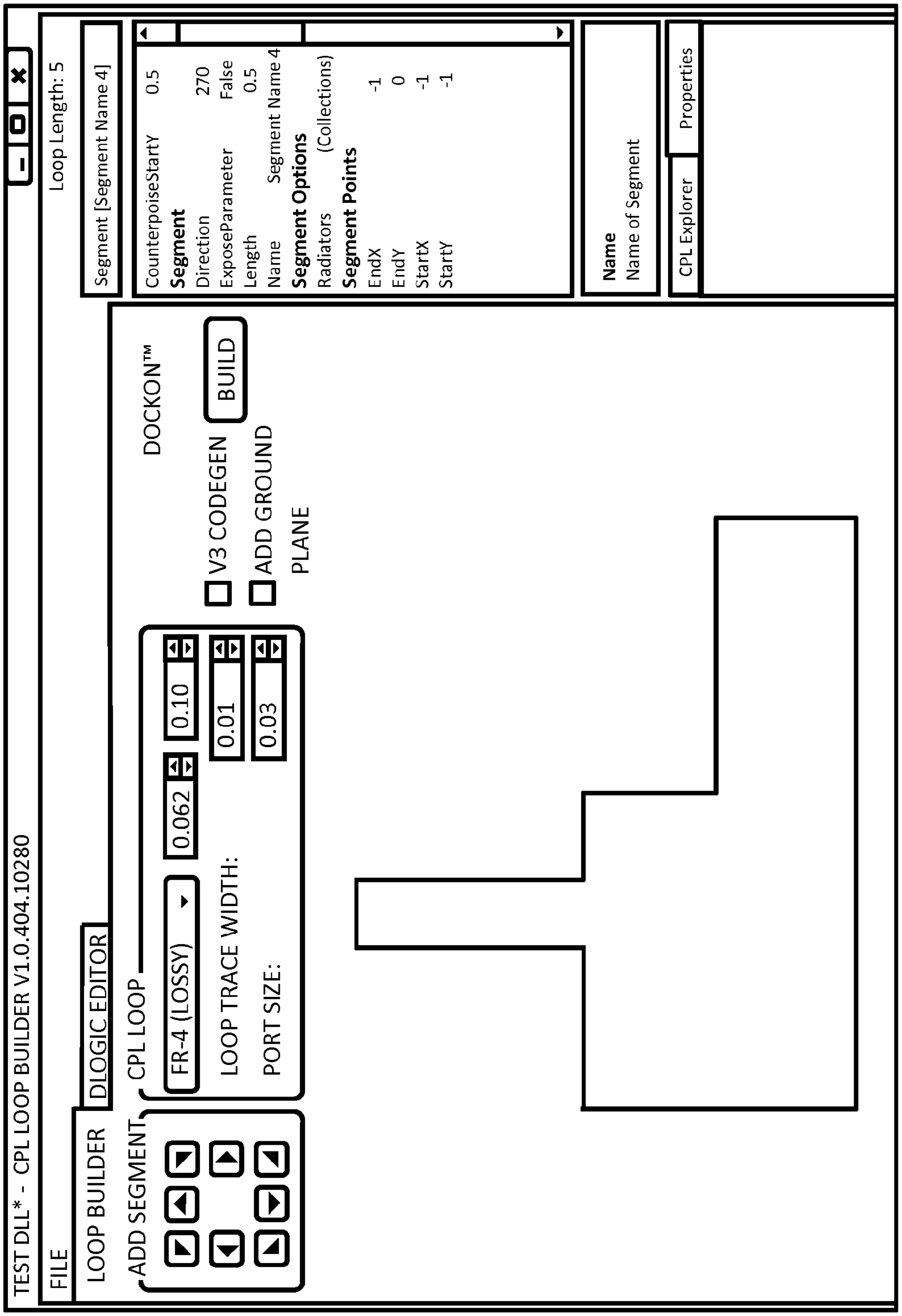
FIG. 3B illustrates an alternative interface of the antenna builder allowing for the antenna segments to be drawn and manipulated with the mouse control and with the arrow controls in accordance with an embodiment.

FIG. 3B illustrates yet another example of the antenna builder interface in accordance with an embodiment. In the antenna builder illustrated in FIG. 3B, the antenna segments are drawn and manipulated with the mouse or by using the arrows from the add segment subpanel, rather than by editing a list of antenna segments. The properties of each antenna segment can be edited by selecting an antenna segment with the mouse, and editing the properties through the properties panels on the right side of the interface.

Figure 4A:
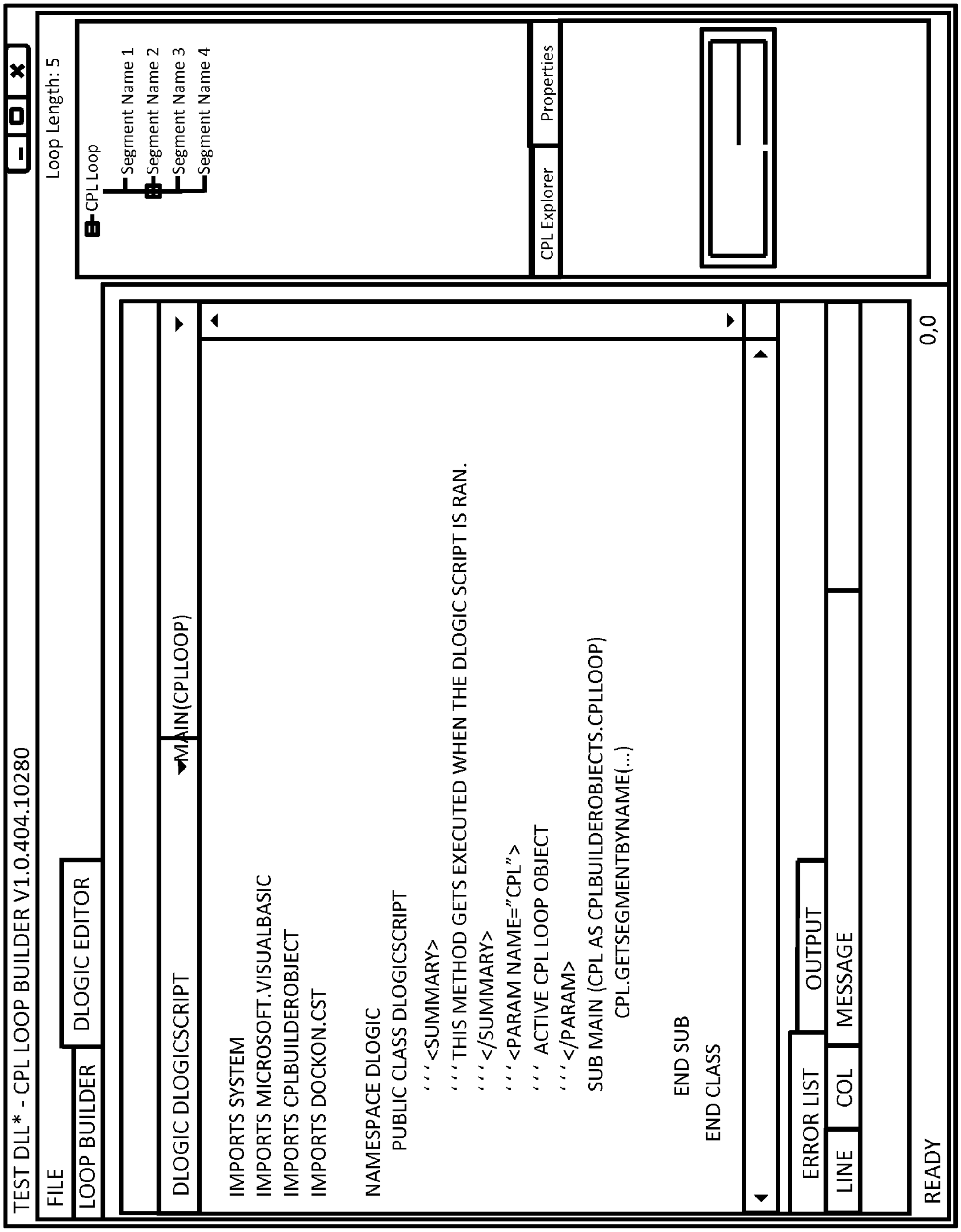
FIG. 4A illustrates the dLogic tab of the antenna builder in accordance with an embodiment, allowing users to write custom logic associated with antenna segments.

FIG. 4A illustrates the dlogic tab of the antenna builder. The dlogic tab allows users to write .NET code to specify additional antenna logic. For example, the dlogic tab can be used to write logic for a new property of an antenna segment, to write logic for a new type of antenna architecture, to write logic for a complex antenna architecture, etc. The dlogic tab is described in terms of supporting any programming language supported under the .NET framework. However, alternative embodiments of the dlogic tab can support alternative programming languages that are not part of the .NET framework, including C, C++, PYTHON, RUBY, JAVA, etc. By writing custom logic, a user can also create routines that control the antenna builder interface, that make external calls to third party applications, or routines that when loaded to a third party application as a plug-in/add-in, can control the interface and perform operations in the third party application. For example, a user familiar with the API of a third party application, such as CST, can write dlogic code that can execute commands in CST and/or ask for user input via CST. For example, a user can write a plug-in or routine, that when loaded to the third party application, displays a dialog prompting the user to enter a desired frequency of operation for an antenna, and subsequently performs a number of operations within the third party application using the user input.

Alternative embodiments of the dlogic tab enable a user to write logic for antennas using a visual programming language. Visual programming languages enable a user to write logic by manipulating graphical elements, rather than by specifying the logic textually. For example, if a user wanted to create logic to specify the possible range of positions for an electric field radiator, then the user could select the electric field radiator, select the define position option, and with the mouse, move the electric field radiator to indicate a range of positions for the electric field radiator. The visual programming language can also be used to specify elements which should not be positioned close to each other in order to prevent capacitive coupling of these elements. The use of visual programming languages is well known in the art of programming languages.

Figure 4B:
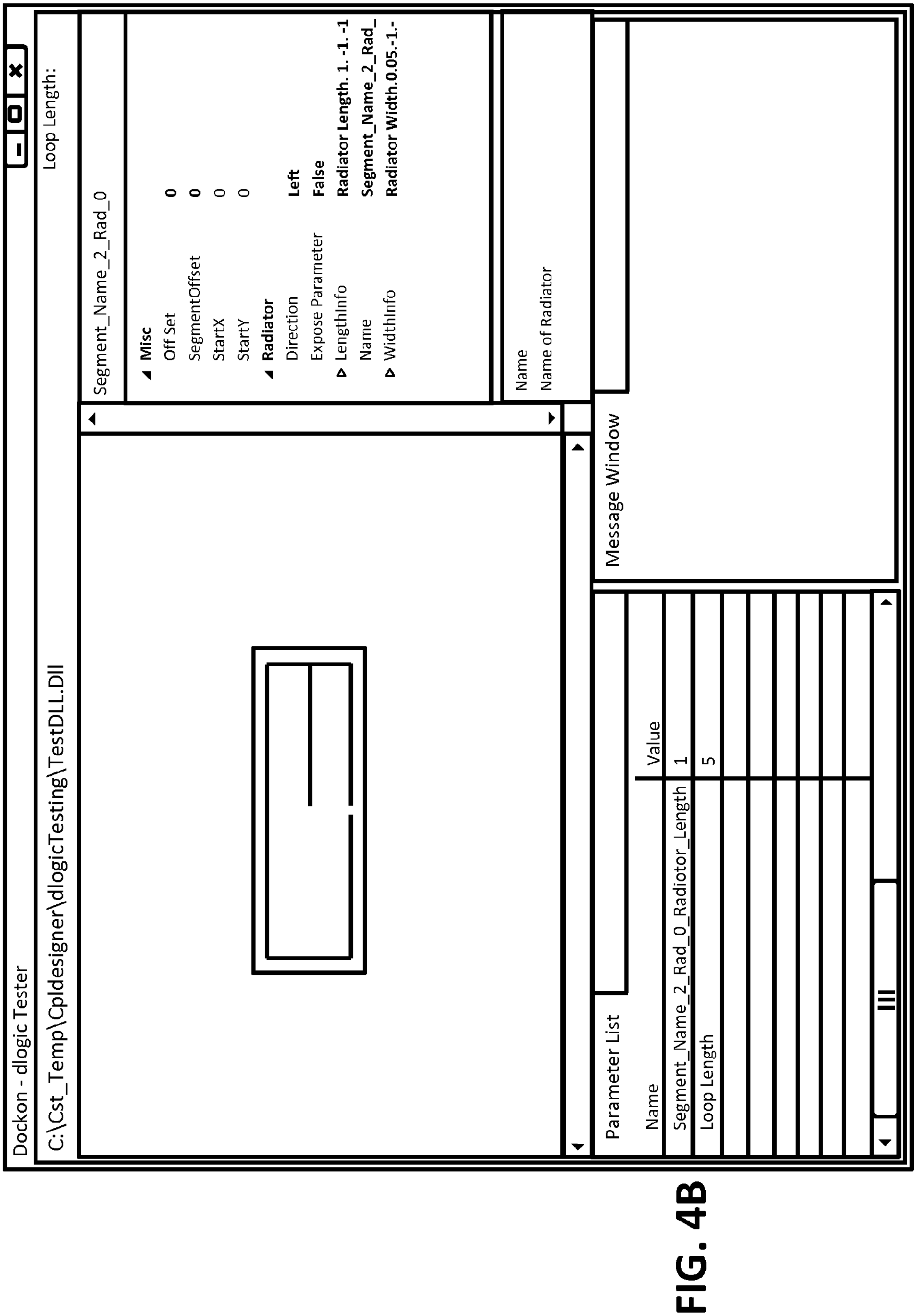
FIG. 4B illustrates an embodiment of a tester application displayed when the user finishes building an antenna, the tester application allowing the user to test custom logic, to view the structure of the overall antenna, and to view and edit the parameters of the antenna segments.

FIG. 4B illustrates an embodiment of a tester application that can run inside of the builder or that can run as a standalone application. The tester application can be configured to display when the user presses the build button on the antenna builder interface. The tester provides a visual way to test the code written in the dlogic tab and test an antenna design prior to loading the antenna into a third party application, such as CST. The tester displays the structure of the antenna, it provides a parameter list, it allows the user to change the parameters and to see the results of changing the parameters, it allows the execution and running of code written in the dlogic tab, and it displays debugging messages.

Embodiments of the builder enable a user to save an antenna design as a project. A single project can also include more than one antenna design. Saving the antenna design consists of converting the antenna design, including all of the antenna segments and their properties, to one of many data formats.

For instance, for any type of antenna having a magnetic loop, the following process can be used to save the magnetic loop. The properties of the magnetic loop are saved, primarily the port size, the PCB thickness, the PCB name, the PCB margin, the length of the magnetic loop, the maximum and minimum values of the length of the magnetic loop, the loop trace width, and the maximum and minimum values of the loop trace width. In addition to saving the properties of the magnetic loop, each of the additional antenna segments along with their properties are saved. The length of the additional antenna segments can be saved as the actual length of each segment, or they can be saved as a percentage of the total length of the magnetic loop. For example, if the magnetic loop is to have a length of 10 centimeters, and a first segment has a length of 1 centimeter, then the length of the first segment would be saved as 1/10 or 10%.

In an embodiment, a class object associated a particular antenna architecture can be used to represent an antenna design, with the contents of the class object or the class object itself saved to a file as the output of the antenna design. For example, the CPL class object can include the high level properties of the CPL antenna, including the PCB properties. In addition, the CPL class can include a collection, an array, a list, or any other set structure for storing a collection of items, such as the antenna segments along with their respective properties. An antenna segment can also be stored in a class object, with the magnetic loop class object maintaining a collection of antenna segment objects. As previously discussed, there are many methods of storing the antenna representation created using the antenna builder. For example, rather than using class objects, an alternative embodiment can use nested lists to store the information for the antenna segments.

Class objects can be serialized, stored in a database using object relational mapping, or written to a file by writing the values of all the variables in the class object without serialization. In yet another embodiment, the output can consist of instructions or source code that would enable a third party application to use the information generated with the antenna builder. For example, a simulation program such as CST may not use a CPL class object. Hence, loading the CPL class object into CST would not be possible, or would not result in CST being able to use the CPL class object to actually create an antenna design. In such cases, the antenna builder can output and generate code and instructions that would enable CST or any other program to use the data from the antenna builder. Hence, rather than outputting a CPL class object, embodiments may output coordinate data that can be used by CST to draw the antenna design, or data in a format expected by CST. For example, the antenna builder can output an antenna design as VBA code. When the VBA code is loaded into CST and executed by VBA engine in CST, the VBA code automatically creates the antenna design without the user having to manually create the antenna using CST's 3D modeling environment.

FIG. 5 illustrates an example of delimited text based commands used as an intermediary language for drawing data of an antenna. Third party applications can then draw the antenna design by parsing the commands illustrated in FIG. 5, or by using a plug-in/add-in that can parse the text based commands. The commands and their corresponding formats are merely an example, and alternative commands and formats can be used without departing from the spirit of the disclosure. For example, the commands can be formatted as comma delimited, tab delimited, XML, YAML, JSON, etc. The text based commands allow for the drawing data of an antenna design to be decoupled from the logic and properties of the antenna segments.

In the commands illustrated in FIG. 5, the first word represents the command, and everything following the command represents the arguments associated with the command, i.e. "CMD Name, Arg1, Arg2, . . . ". The SETVERSION command sets the active command set version used to draw the objects. This allows the applications parsing the commands to maintain compatibility with older versions of the command set. For example, if an antenna design was created using an older version, the data may be structured differently, or the commands may have arguments arranged in a different way. The SETVERSION command enables the application parsing the drawing data to know exactly which commands to parse and how to parse the arguments associated with each command.

The SETLAYER command changes the active layer along the Z-axis. The SETMATERIAL command changes the active material type used to draw objects. Finally, the POLYGON command draws a polygon on the active layer specified by the SETLAYER command. Alternative embodiments of the command set can include a CIRCLE command, which draws a circle on the active layer, with the radius and the center of the circle passed as arguments. The command set can also include a RECTANGLE command, which draws a rectangle using four points passed as arguments.

The SETVERSION command has the following syntax:

"SETVERSION,CMD VERSION,MODULE NAME, MODULE VERSION,TIMESTAMP"

The CMD VERSION argument indicates the active command version to use, the MODULE NAME argument indicates the name of the module that created the output illustrated in FIG. 5. The MODULE VERSION represents the version of the module that created the drawing data, and the TIMESTAMP is the date and time of the output. The SETVERSION command affects how all the subsequent commands are interpreted and it allows for a mix version of commands to exist in the same output.

The SETLAYER command sets the active layer and defines the Z-Axis for that layer. The syntax for the SETLAYER command is "SETLAYER, NAME, Z-AXIS". The NAME parameter is a name assigned to the current layer, and the Z-AXIS command sets the Z-axis offset for the layer.

The SETMATERIAL command sets the active material type used to draw objects. The syntax for the SETMATERIAL command is "SETMATERIAL, MATERIAL NAME". Finally, the POLYGON command has the following syntax: "POLYGON, NAME, WIDTH, THICKNESS, {X1,Y1,X2, Y2, . . . }". The NAME parameter is an identifying name for the polygon being drawn. The WIDTH parameter indicates the line width to use when drawing the polygon, which may be a line width greater than 0 or a −1 to indicate that the polygon is to be filled. The THICKNESS command specifies the thickness of the polygon line, which allows the polygon to be drawn in three dimensions by having a depth. Finally, the X,Y points are the list of coordinates that make up the polygon line.

Figure 6:
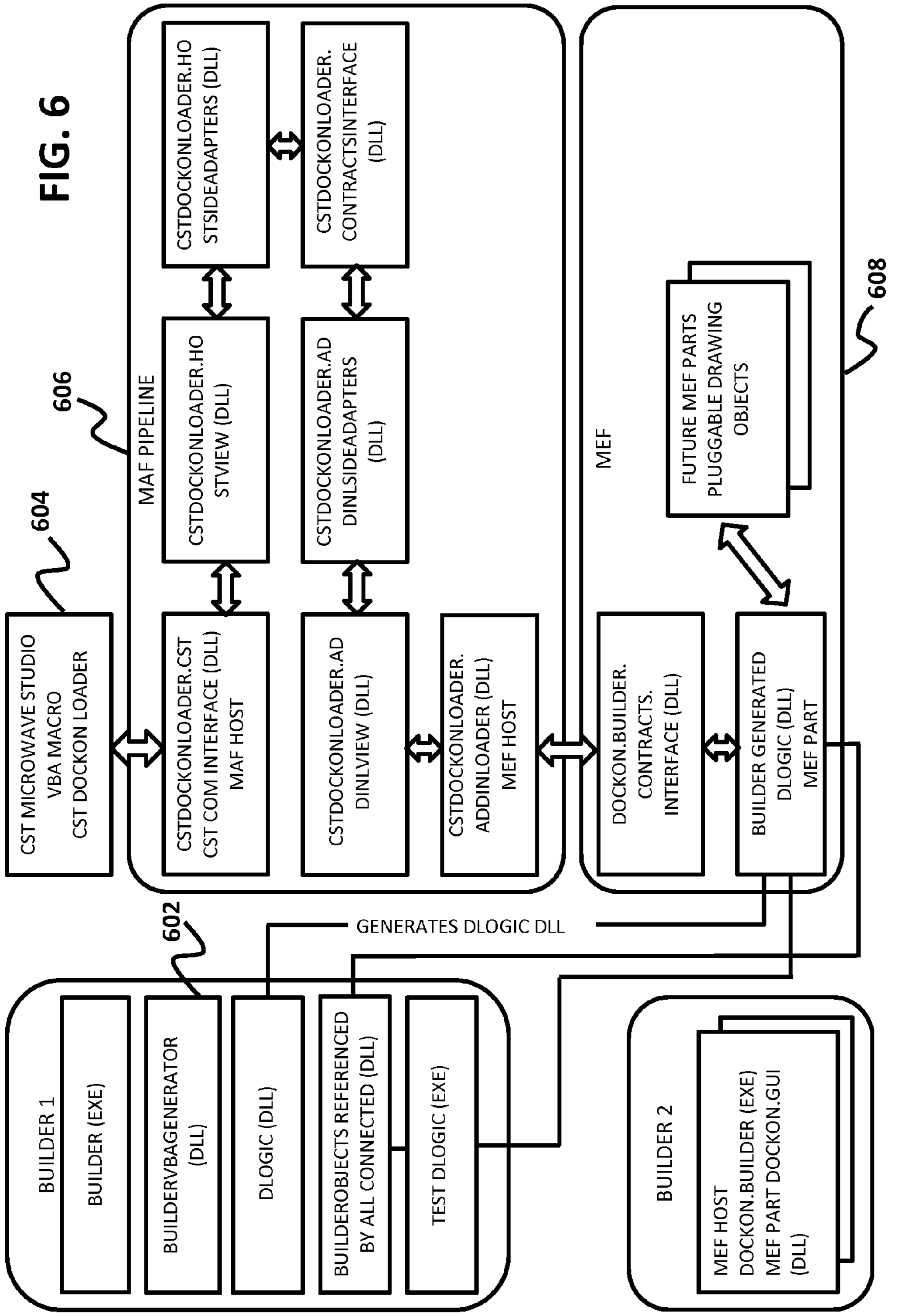
FIG. 6 illustrates an embodiment of a loader structure used for the run-time loading and unloading of antenna designs and their associated logic in third party applications.

FIG. 6 illustrates an embodiment of a loader structure used to enable the run-time loading and unloading of antenna designs and their associated logic in third party applications. FIG. 6 is shown as a loader structure for CST, but any other third party application can be used in place of CST. The loader structure illustrates two embodiments of a builder. A first embodiment of the builder includes a VBA generator 602 which converts an antenna design into a VBA script, which when executed by CST creates the antenna design. The loader 604 consists of a VBA script that reads the intermediate drawing language illustrated in FIG. 5. The loader 604 receives and parses the intermediate language and draws it in CST. The loader 604 represents CST running a VBA macro or plug-in that allows antenna designs to be loaded to CST. The MAF host object has a COM interface exposed that allows CST to interact with it. It can be implemented as a .NET native DLL.

The managed add-in framework (MAF) pipeline 606 is used to enable applications to load and unload plug-ins on demand during run time. The MAF pipeline 606 to load and unload DLL on demand is not necessary for embodiments. However, in embodiments where the drawing data and the associated logic is stored in DLLs, the MAF pipeline 606 allows these DLLs containing drawing data and their associated logic to be loaded even after a third party application is running. For example, if a user decided to modify an antenna design after running some simulations, then the MAF pipeline 606 enables a user to edit the antenna design in the builder, create a new DLL containing the modified antenna design, and reload the corresponding DLL in the third party application without having to close the third party application. The managed extensibility framework (MEF) 608 is used to enable the ability to load a plug-in or add-in DLL from any directory structure.

Figure 7:
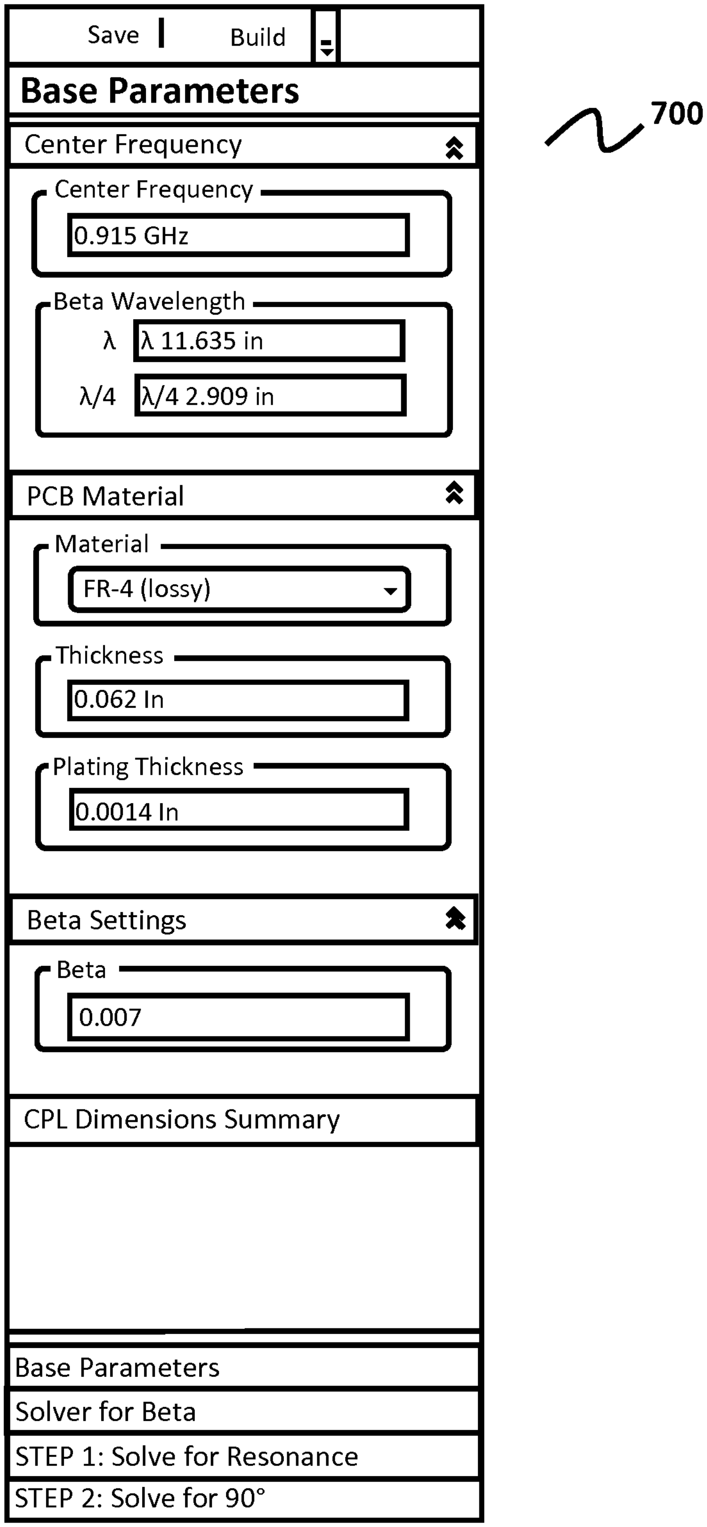
FIG. 7 illustrates an embodiment of a plug-in panel providing antenna builder functionality inside third party applications.

FIG. 7 illustrates a plug-in panel associated with the antenna builder that can run inside CST or inside other third party applications. The plug-in can communicate and interact with the third party application by using the API of the third party application or by running on any macro or scripting runtime engines provided by the third party application. From herein the plug-in panel will be referred to as "the builder plug-in".

Third party applications such as 3D modeling tools and electromagnetic simulation programs typically have elaborate interfaces that are difficult to navigate. Due to the large number of options available in these complex programs, their interfaces are organized into a large number of menus, panels, and dialogs, which increases the learning curve of new users. Even for experienced users it can be difficult to navigate through a complicated interface in order to change a specific setting. Most importantly, it can be easy to forget to set the proper settings when starting a new project.

Embodiments of the builder plug-in can be used to set a plurality of parameters in the third party application to a set of default values. The builder plug-in provides a set of default settings related to antenna design, thereby lessening the learning curve of new users not familiar with the interface of a third party application. In addition, changing the settings of the third party application to the default settings allows an experienced user to immediately use the third party application without having to spend time trying to find and set the environment settings and other global settings according to the user's needs and preferences. Examples of such settings will be dependent on the third party application. For instance, in the context of an electromagnetic simulation program such as CST, these settings can include the types of units to use, background settings, boundary settings for where the antenna is being drawn, mesh settings, among others.

The setting of default values of the third party application via the builder plug-in also enables the settings of the third party application to be set according the type of antenna architecture associated with the antenna design being loaded. When loading CPL antenna, one or more first settings of the third party application can be set to a first set of values, while when loading a dipole antenna, one or more second settings of the third party application can be set to a second set of values.

The user can also modify the settings of the third party application and save these settings as a different settings template. For example, a user can have a first settings template for compound loop antennas with a built-in counterpoise, a second settings template for compound loop antennas without a built-in counterpoise, a third settings template for Yagi antennas, a fourth settings template for dipole antennas, etc.

The builder plug-in illustrated in FIG. 7 illustrates an example of a plug-in with options associated with CPL antennas. However, in alternative embodiments the builder plug-in can display options corresponding to different types of antenna architectures. Similar to the builder interface, the builder plug-in can display options according to the antenna design loaded.

The builder plug-in 700 of FIG. 7 displays the center frequency, the beta wavelength, properties of the PCB material, and other properties that were set by the user or automation engine through the antenna builder for the corresponding antenna design. For example, the user specified that the antenna design was to use FR-4 substrate, with the PCB having a thickness of 0.062 inches, and a plating thickness of 0.0014 inches. The antenna builder allows the user to set the base parameters for an antenna design and associate settings with antenna segments. However, the loop macro further enables a user to change base parameters of the antenna design. For example, a user may have set the antenna material to FR-4 in the antenna builder, but may then decide to change the substrate to an alternative substrate after the user loads the generated antenna design into the simulation software. Other properties that can be set or changed by the user through the loop macro include the trace width, the beta length, the global frequency start, the global frequency end, the optimizer frequency range start, and the optimizer frequency range end.

The builder plug-in 700 also defines a set of relationships between components in the antenna. The set of relationships also includes constraints on the various components of the antenna. In the case of a CPL antenna, for example, positioning a balun too close to an electric field radiator generates capacitive coupling between the balun and the electric field radiator, which can negatively affect the performance of the antenna. Hence, the set of relationships between components in an antenna limit the blind variations which may be made by an optimizer. For example, as part of optimization, the optimizer may change the position of the electric field radiator too close to the balun, or even position the electric field radiator so that it is positioned physically on top of the balun. Therefore, the relationships limit the types of antennas that can be generated based on antenna design knowledge, preventing antennas from being generated that would not work or would not be physically feasible.

The logic of an antenna design or the logic associated with a particular antenna architecture can specify a set of relationships to adjust the geometry of the antenna and of the various antenna segments. For example, a first relationship can define the ratio between the loop trace width and the loop length, such as an eighth wavelength for the center frequency should be less than the loop trace width, or the dielectric divided by 2.75 should also be less than the loop trace width. If either of these values is greater than the loop trace width, then the loop trace width is adjusted accordingly. The logic can also calculate the loop aspect ratio, and the maximum and minimum values for the magnetic loop length and for the width of the magnetic loop trace. In an embodiment, the maximum magnetic loop length is 120% of the magnetic loop length specified by the user, and the minimum magnetic loop length is 80%. However, these ranges can be changed by the user through the builder plug-in or through the antenna builder.

The method of building the actual antenna structure within a simulation program based on the output from the antenna builder will depend on the actual simulation program. In an embodiment, the elements of the antenna can be constrained according to some default settings. These default settings can be customized by a user through the builder plug-in or through the antenna builder.

In the case of a CPL antenna including a balun, the height of the balun can be determined based on an eighth of the wavelength at center frequency (original height). The minimum height for the balun can be 75% of the original height, while the maximum height for the balun can be a quarter wavelength at center frequency. The width of the balun can be set based on the loop trace width. For example, if the loop trace width is greater than approximately 0.1, then the balun width is set to approximately 0.33. On the other hand, if the loop trace width is less than about 0.1, then the balun width is set to approximately 0.21. The minimum width for the balun can be about 85% of the originally computed balun width, while the maximum width for the balun can be about 175% of the originally computed balun width. Once the dimensions and ranges of the balun have been computed, the loop macro determines whether the balun fits within the magnetic loop given the computed dimensions of the magnetic loop. For example, if the sum of loop trace width multiplied by two, the balun width, and the port spacing, is greater than the computed aspect of the magnetic loop, then the balun does not fit within the magnetic loop structure. If the balun cannot fit, then the balun may be positioned underneath the magnetic loop or otherwise redesigned.

In the case of a CPL antenna including a counterpoise and a transition, the length and width of the counterpoise and the transition can be initially set based on a set of relationships. The length of the counterpoise and the transition can be set by subtracting 3/2 of the loop trace width from the aspect ratio (aspect ratio−(loop trace width/2)*3). The width can be set by multiplying the magnetic loop trace width by two. Hence, the transition and the counterpoise, if they are part of an antenna design, are initially set to have a width that is double the normal width of the magnetic loop trace.

In the case of a CPL antenna including one or more electric field radiators, the default length of the electric field radiators can be set to one quarter wavelength of the center frequency. The minimum possible length of the electric field radiator can be set to 60% of the default length. The maximum possible length of the electric field radiator can be set to approximately: AspectRatioLength−((Loop_Trace_Width/2)*3)+Radiator_Margin, where AspectRatioLength represents the length of the computed aspect ratio of the magnetic loop, Loop_Trace_Width represents the width of the magnetic loop trace, and Radiator_Margin represents the margin property of the electric field radiator. The default width of the electric field radiator can be set equal to the width of the magnetic loop trace.

The example described above illustrates how sets of relationships defined by the antenna builder, or defined by the user through the controls provided by the builder and through the dlogic tab, can be used to specify properties of antenna segments. The same principles described above can similarly be applied to other types of antennas. For instance, in a Yagi antenna, the length of the parasitic elements can be defined as a ratio of the driven element, and the spacing between any two elements can be defined based on a ratio of the lengths of the two elements.

After an antenna design has been created, the user can use an optimizer to tune the performance of the antenna or any other desired factor of the antenna. As previously described, a variety of optimizers can be used. Examples of optimizers that can be used for the optimization process include a frequency domain solver (F-solver), a transient solver (finite difference time domain—FDTD, genetic algorithms, hill climbers, or some other form of greedy algorithm. The optimizer can be part of an electromagnetic simulation program, a 3D modeling tool, a stand-alone optimizer program, the antenna builder, or some other third party application.

As noted above, the optimization criteria maximized or minimized by an optimizer are dependent on the particular antenna design and on the user's requirements. For instance, the user can use the optimizer to maximize the antenna performance of an antenna. Alternatively, the user can use the optimizer to maximize the matching between a desired radiation pattern and the actual radiation pattern of the antenna. The optimizer can also be used to maximize the antenna performance of the antenna that fits within a specified area, to minimize impedance mismatch, to minimize capacitive coupling between antenna elements, to maximize the radiation pattern in a particular direction, to maximize antenna performance by changing the positions of antenna elements, to maximize antenna performance by adding capacitive tuning patches, to maximize performance by modifying the geometry of the magnetic loop, etc.

The use of an optimizer with antenna designs is not limited to single-variable optimization. Embodiments can also use an optimizer to perform multivariable optimization. For instance, the optimizer can be configured to maximize both antenna performance and the radiation pattern along a particular direction. Alternatively, the optimizer can be configured to minimize capacitive coupling between elements, while maximizing the matching between the actual radiation pattern of the antenna and a desired radiation pattern. The multivariable optimization can be N dimensional, and the user can also be given the choice to specify weights associated with each of the criteria being optimized.

Different optimizers work differently. In order to optimize antenna designs, the optimizer tests an antenna design to determine how well the antenna meets the optimization criteria, and based on the results tunes the performance of the antenna. For example, if the optimizer is maximizing antenna performance, then the optimizer can perform an electromagnetic simulation of the antenna, with the result of the electromagnetic simulation returned to the optimizer as an assessment of the antenna's performance.

Embodiments of the antenna builder can be deployed as a desktop application, as a mobile application or as a web application. The antenna builder can also include an application wizard, similar to the interface of the builder plug-in illustrated above. The application wizard can ask the user to provide mechanical specifications (such as the material type of the PCB), electrical specifications (such as the specifications of the input feed), and electromagnetic specifications (such as the radiation pattern, antenna efficiency, polarization preferences). Based on the specification input provided to the application wizard, the application wizard can create an initial antenna design or search for a previously created antenna design that matches the required specifications. The application wizard can also initiate an optimization run to further customize the antenna design to meet the required specifications.

Yet another embodiment is directed to a method of building and maintaining a repository of antenna designs. As users create different antenna designs, and as the optimizer creates antenna designs during optimization runs, these antenna designs are saved to a repository. The repository of antenna designs can be queried and browsed to enable users to find antenna designs without having to create an antenna design from scratch. The repository of antenna designs also enables users without any antenna design experience to search, browse, and create antenna designs. For example, a customer representative of a company without any antenna design experience can receive a set of requirements from a customer, and using the requirements alone the customer representative can search for existing antenna designs meeting the customer's requirements. If none of the antenna designs in the repository meet the customer's requirements, then the customer representative can submit a job query that automatically creates one or more antenna designs that meet the customer's requirements. The job query can trigger the optimizer to search for antenna designs that meet the customer requirements, with the optimizer starting from randomly created antenna designs or by using antenna designs from the repository to seed the optimization run.

Figure 8A:
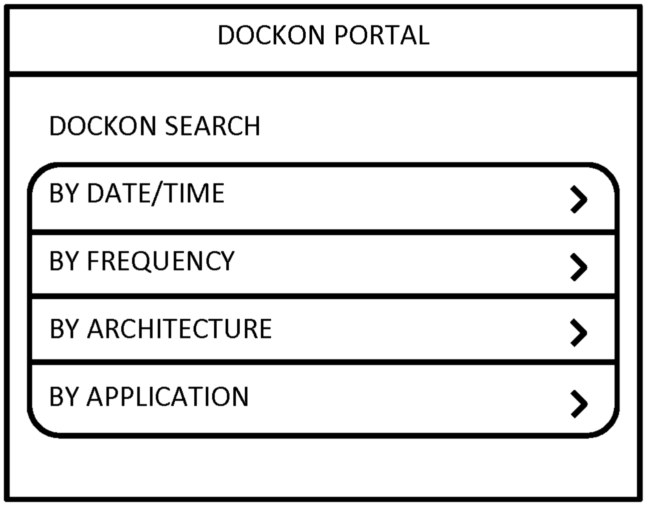
FIG. 8A illustrates a web interface of an antenna repository in accordance with an embodiment.

FIG. 8A illustrates a web interface that can be used to query and browse the database of antenna designs. In alternative embodiments, the web interface can also be used to view and generate reports, and to submit new job requests. A job request consists of a request to optimize an antenna design according to a set of user requirements. Embodiments can include a job manager, which allows a user to view the number of job requests in a queue, to delete submitted job requests, to edit a pending job request, to cancel a running job request, and to view the progress of the optimizer while performing an optimization run. For example, the web interface may display the number of iterations currently completed by the optimizer and the estimated remaining time for the optimizer to finish the current optimization job.

In an embodiment, the web interface enables a user to query the repository (or database) for antenna designs by specifying one or more requirements, such as the center frequency, the type of PCB material, etc. If the search returns no results, then a job request is automatically created, which sends the user requirements and adds an optimization job to the job request queue. If the search returns some results, but these results are not found to be satisfactory by the user, then the user can manually request a new optimization job. Alternatively, the user may select one of the results returned by the query, and specify that the selected antenna is to be used to seed a new optimization job.

As described herein, once an antenna representation has been saved via the antenna builder, the output can subsequently be loaded into a plurality of tools, including CAD drawing tools and simulation tools. An important aspect of embodiments consists of the optimization of antenna designs. However, antenna designs generated with the antenna builder cannot be optimized without taking into consideration how the geometry and the components of the antenna affect its performance. Electromagnetic simulation programs, such as CST, enable the analysis of performance, such as by visualizing surface currents, or by optimizing an antenna design based on the simulation data.

The antenna builder enables a user to specify parameters to be exposed. A parameter that is exposed refers to a parameter that can be varied by an optimizer in order to find an antenna design that meets a set of optimization goals. For example, a user may expose the length of the magnetic loop as the only variable to be varied in order to optimize the goals specified by the user. The goal in this example can be a CPL antenna operating at a frequency of 2.8 GHz with an efficiency of at least 60%. The optimizer could then increase or decrease the length of the magnetic loop to find a 2.8 GHz antenna with an efficiency of at least 60%. The optimizer can run for a fixed number of iterations or generations, with the best solution at the end of the fixed number of iterations presented as the overall best solution that meets the optimization goals. Depending on the type of optimizer, the optimizer can also maintain a population of antenna designs, with the population of antenna designs changing with every iteration. At the end of the optimizer run, the best solution, or the best N solutions, from the population that meet the optimization goals can be presented to the user.

In an embodiment, a genetic algorithm can be used to optimize antenna designs that meet the set of optimization goals. A genetic algorithm is an optimization method that maintains a population, where each individual in the population is a potential solution to the problem being solved. Each solution is encoded into a chromosome, which depending on the nature of the problem, can be encoded as a binary bit string, as a real numbered string, or as a tree structure, among other possible encodings. The use of genetic algorithms is well known in the art. Genetic algorithms use the principles of natural selection and survival of the fittest to evolve the population of solutions towards high fitness solutions. The fitness of each solution in the population is based on how well each solution meets the optimization goals.

Returning to the antenna optimization example where the length of the magnetic loop is the only variable exposed to the optimizer, the genetic algorithm would create a population, where each individual in the population would consist of an antenna with a different length of the magnetic loop. For example, in a genetic algorithm with a population size of 4, the four individuals in the population may have lengths of 2.5 cm, 3 cm, 10 cm, and 7 cm. The genetic algorithm would then test the performance of each of these antennas by running electromagnetic simulations to determine how the length affects the performance of each antenna. The genetic algorithm may then find that the antenna with the length of 7 cm performs the best, with the antenna with the lengths of 2.5 cm and 3 cm performing the worst. Genetic operators of crossover and mutation, as are well known in the art of genetic algorithms, would then be used to create a new population of antenna designs, favoring reproduction of antennas that perform the best. By this method, the genetic algorithm progresses the population towards antenna designs that best meet the optimization goals.

The optimization goals are not limited to efficiency. A plurality of optimization goals can be used. For example, VSWR or return loss, the measured gain, and even the shapes of farfield patterns or 2D radiation patterns can be as optimization goals. In addition, an optimizer is not limited to a single optimization goal. For example, an optimizer can be given two or more goals, such as minimizing return loss while maximizing the frequency range where VSWR is at a desired ratio. A third goal can be a desired shape of a 2D radiation pattern on the XY plane. Multi-objective optimization techniques are well known in the art. For example, each of the optimization goals can be given a preference or weight, with the overall goal consisting of a weighted sum of the scores from each of the goals. For example, minimizing return loss may be the most important goal to a certain user, while the shape of the 2D radiation pattern may not be as important. In that case, the user can assign a weight of 0.40 to the minimization of the return loss, a weight of 0.40 for the maximizing of the frequency range for the desired VSWR ratio, and a weight of 0.20 for the matching of the desired shape for the 2D radiation pattern. Alternatively, multiple goals can be optimized using Pareto optimality or some alternative method of maximizing various goals.

In the case of a CPL antenna, parameters of the antenna and antenna elements that can be optimized include the balun port width, the balun port height, the electric field radiator offset along the length of the magnetic loop, the electric field radiator length, and the magnetic loop length. Alternative embodiments can also optimize properties of the transition and counterpoise, including the transition length, the transition width, the counterpoise length, the counterpoise width, the magnetic loop width, and the electric field radiator width. In yet another embodiment, the optimizer may also explore more complex structural optimizations of the overall antenna, including the number of electric field radiators, the position of multiple electric field radiators, the magnetic loop aspect ratio, the magnetic loop shape, the counterpoise location, the counterpoise shape, the transition location, and the transition shape. Such complex structural optimizations can also include the use of corners of the magnetic loop cut off at an angle, the use of narrow-wide-narrow transitions, and the use of wide-narrow-wide transitions in the magnetic loop, as well as many other variations of designs.

In an embodiment, solutions generated by an optimizer at the end of the optimizer run, and solutions generated throughout the iterations of the optimizer, are saved to an antenna design repository. Optimization can be a very computationally intensive process, requiring hours or even days to find suitable solutions that meet a given set of goals. This is especially the case with antenna design, where the optimizer must generate a large number of antenna designs while exploring antenna designs that maximize the set of optimization goals. In addition, each antenna that is generated must be evaluated by performing complex electromagnetic simulations. In addition, given the nature of the exploration and the search process involved in optimizing solutions, solutions that do not meet the set of optimization goals, but which would be suitable for other uses, can be found. For example, in the process of optimizing a 2.8 GHz antenna with an efficiency of at least 60%, the optimizer may generate a 2.0 GHz antenna with an efficiency of at least 90%. While such an antenna is not suitable for the current optimization goals, such an antenna is nevertheless valuable. Not saving such an antenna design would not only waste the computational resources and time spent on that particular antenna design, but also given the nature of optimization, there is no guarantee that that particular antenna design would be found again in a subsequent optimization run.

Saving antenna designs that are generated by the optimizer as part of the optimization process allows for a repository of valuable antenna designs to be created. Certain minimum optimization requirements could be established to prevent every antenna generated as a result of the optimization process from being saved to the repository. This repository of antenna designs could then be queried to find an antenna that closely matches a new set of user requirements. Thus, the repository also enables for a new set of optimization goals to be met without having to rerun the optimizer, since a suitable solution may already have been generated by previous optimization runs. The antenna designs stored in the database can also be used to bootstrap other optimization runs. For example, a user may query the repository by entering a set of desired antenna properties. If the user is not able to find a satisfactory solution, then the user can create a new optimizer run to find a suitable antenna. Alternatively, if the user finds an antenna design that partially meets the set of desired antenna properties, then the user can use the found antenna design to seed a new optimization run. In other words, the optimizer can use the antenna design found by the user in the repository as the seed or starting point for a new optimization run, by optimizing variations of the existing antenna design.

In an embodiment, the repository can enable the user to browse visually the antenna designs stored in the repository. The antenna designs can be stored visually in the repository or they can be stored using alternative representations which can readily be converted to a visual representation. For example, in an embodiment the repository can store a set of coordinates for the position of each component of an antenna, along with the respective dimensions for each component. In this case, the set of coordinates and the position of each component in the antenna would need to be converted to an actual visual representation in order to allow the user to view the antenna. It is noted that the actual raw data representation can be presented to the user for viewing. For example, the user may be presented with the following: "e-field radiator: (−10,10), width: 4, length: 10; counterpoise: (−20,0), width: 8, length: 20, tapered: true; . . . ". However, presenting the user with a textual description of the antenna would make it difficult for the user to visualize antennas, in addition to increasing the cognitive load on the user, and increasing the likelihood of the user getting frustrated, confused, or making an error.

The repository can enable a user to explore visually antenna designs based on various visual representations. A dialog or panel can display to the user the various visual representations available, which may include the actual image of the antenna design, a plot of the simulated return loss of the antenna design, a plot of the simulated gain of the antenna design, a plot of the simulated efficiency of the antenna design, a plot of the voltage standing wave ratio of the antenna design, a plot of the 3D farfield pattern of the antenna design, a plot of the 2D radiation pattern along a plane of the antenna design or a plot of three 2D radiation patterns, one or more plots of simulated current flowing through the antenna design, an image of the antenna design fitted within a specific boundary, among other visual representations.

The user can select one or more visual representations to explore visually antenna designs. If two or more visual representations are selected by the user, each of the various visual representations can be displayed next to each other. In addition, the two or more visual representations can be arranged using a grid, with each cell in the grid containing the one or more visual representations associated with a single antenna design. The grids can be formatted to clearly distinguish the visual representations associated with a first antenna design and the visual representations associated with a second antenna design. In an alternative embodiment, the user can change the visual representation used to explore visually antenna designs after the initial selection. For example, a user may first start exploring antenna designs by using the 2D radiation pattern representation. The user may subsequently choose to explore antenna designs by using the plot of the simulated efficiency of the antenna designs.

FIG. 8A shows an embodiment of a web interface of the antenna repository. The screen allows the user to search for repository of antenna designs by searching by date and time, by frequency, by antenna architecture, or by application. Searching by date and time allows the user to search antenna designs based on the date and time of creation of the antennas. For example, a user may search for antenna designs created in the previous week, the previous day, or in the last hour. Searching by frequency enables a user to search antenna designs based on the operating frequency of the antennas, such as 2.0 GHz antennas, antennas between 1.0 GHz and 1.5 GHz, multi-band antennas, narrowband antennas, wideband antennas, etc. Searching by architecture allows a user to search antenna designs based on the architecture of the antennas, such as CPL, Yagi, dipole, planar inverted-F antennas (PIFA), directional antennas, omnidirectional antennas, etc. Searching by application allows a user to search antenna designs based on applications, such as mobile phones, smart phones, laptops, wireless desktop adapters, USB dongles, etc. It is to be understood that web interface illustrated in FIG. 8A can enable a user to browse and search for antenna designs based on a number of other criteria, such as by radiation pattern, by efficiency, by the material properties of the PCB, by size, by shape, by polarization, etc.

Figure 8B:
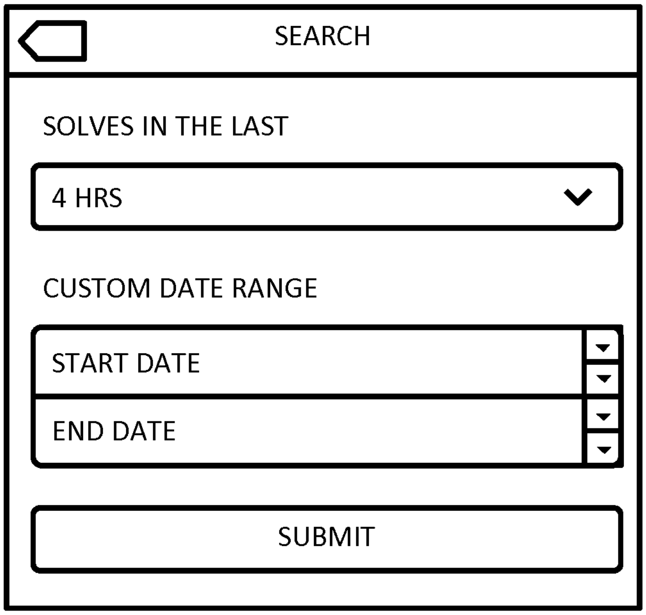
FIG. 8B illustrates the web interface for searching by date and time the antenna repository in accordance with an embodiment.

FIG. 8B shows the screen displayed when the user selects the searching by date and time option illustrated in FIG. 8A. The screen allows the user to search for antenna designs lastly created in a specified period of time, such as the antenna designs created in the last four hours. The screen also provides options for specifying a custom date range.

Figure 9A:
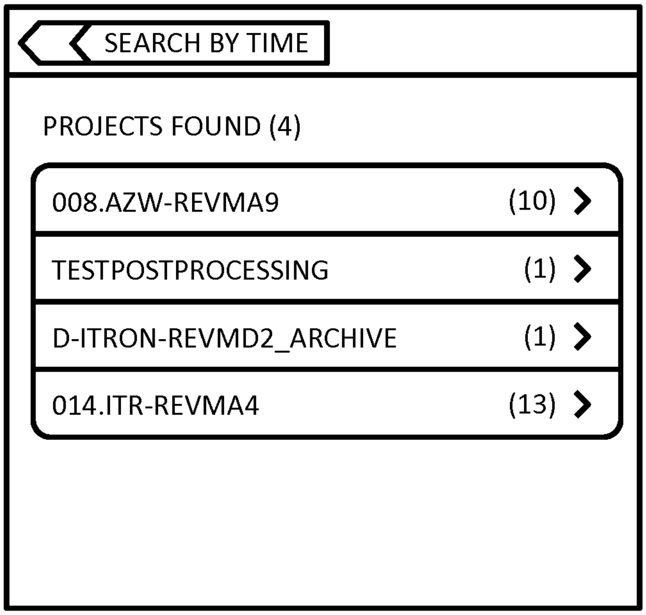
FIGS. 9A and 9B illustrate antenna results displayed after performing a search query in the antenna repository in accordance with an embodiment.

FIG. 9A illustrates an example of a results screen displayed after searching by time. The screen displays four results, with the user having the option of selecting one of the displayed results in order to view details associated with each antenna design. The results in FIG. 9A are organized by project, with each project having antenna designs created for a particular project. For example, if a user created an antenna design, and subsequently used an optimizer to search for alternative antenna designs, then each antenna design created by the optimizer during that run can be saved under the same project. Alternatively, FIG. 9B illustrates individual antenna designs displayed by date and time.

Figure 9B:
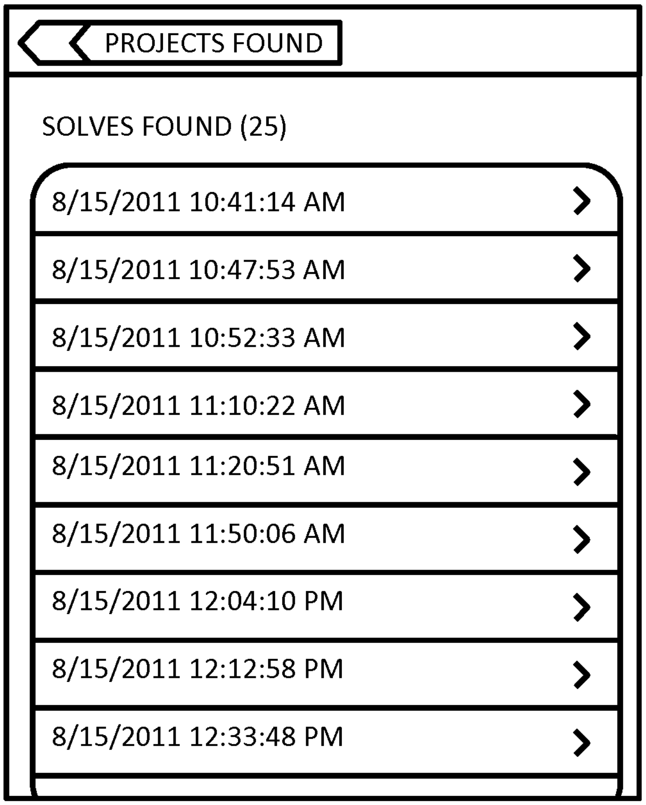
Figure 10B:
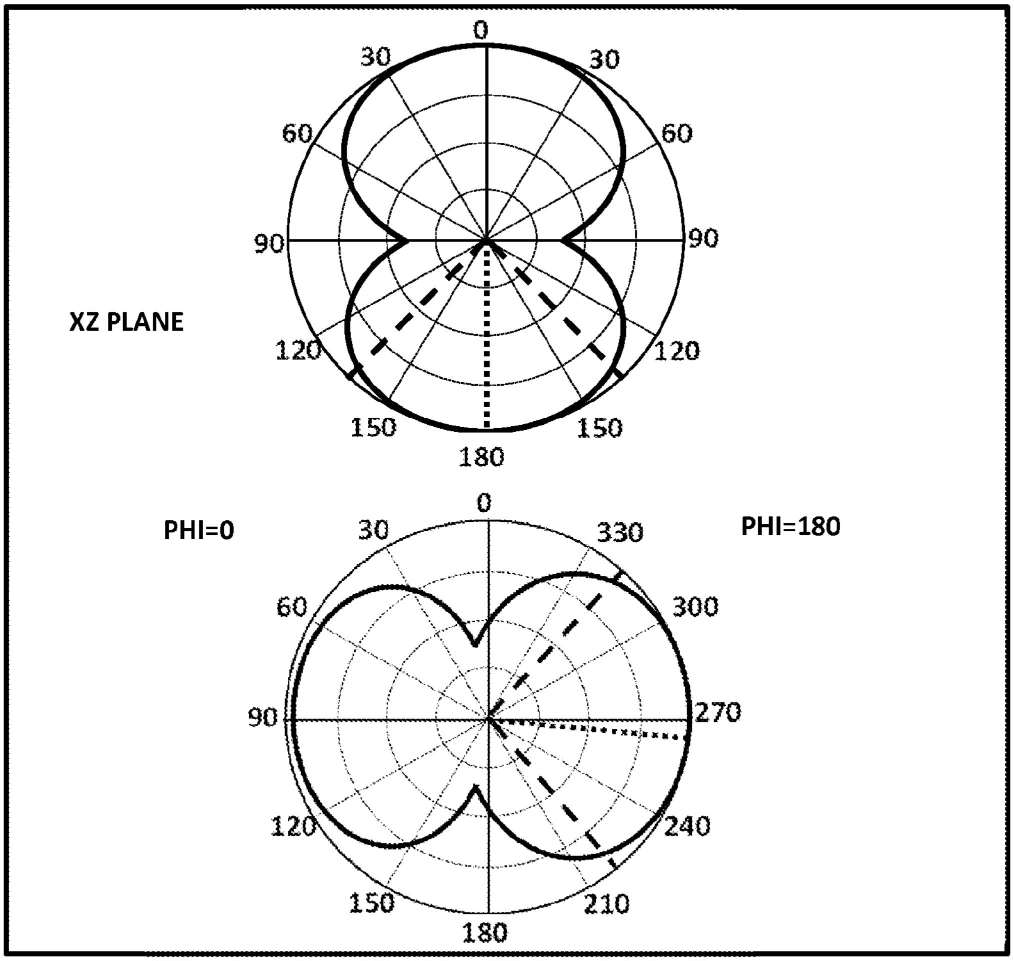

FIGS. 10A and 10B illustrates the report associated with an antenna design when a user selects an antenna design from the results page from FIG. 9A or 9B. FIG. 10A illustrates the top half of the report page, and FIG. 10B illustrates the bottom half of the report page. Alternative embodiments can organize the results and information about an antenna design in a specific way. The results page includes a combination of numerical data, textual data, and graphical data. In alternative embodiments, an image of an actual antenna design can be included in the report page of an antenna design.

In an embodiment, the optimization can combine both subjective and objective decisions. For instance, rather than running the optimizer for a fixed number of iterations, or running the optimizer until a condition is met, the optimizer can be run a small number of iterations, with partial results displayed after the small number of iterations. This would allow the user to provide feedback during the optimization run, rather than having to wait till the end of the optimization run to see results. For example, after 10 iterations, the user may be displayed solutions that the optimizer has found. The user can then decide whether to let the optimizer continue. The user can also edit the solutions, and let the optimizer continue by incorporating the edits made by the user. The user may also choose to change parameters of the optimizer to change the types of solutions being generated. For instance, after 10 iterations the user may find that the solutions are converging to a common solution and lack diversity. In such a case the user could increase diversity by increasing mutation rates or by an alternative method that decreases the convergence rate.

Figure 11:
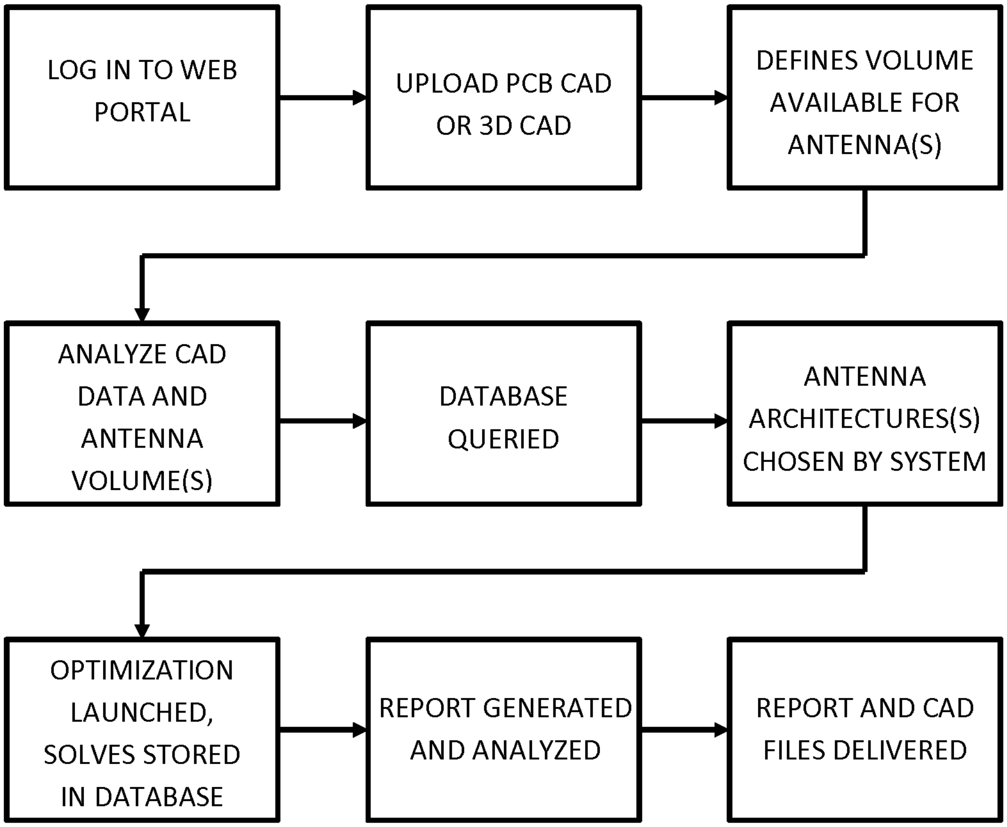
FIG. 11 illustrates a flowchart of the method of automated antenna generation using antenna designs from the antenna repository to seed the antenna generation process.

FIG. 11 illustrates a flowchart of the method of automated antenna generation in accordance with an embodiment. Specifically, FIG. 11 illustrates a process where a user first logs in to a web portal, submits a set of requirements, based on the set of requirements the database is queried, the results of the database query may or may not be used to seed or bootstrap an optimization run, the optimization run is performed and antenna designs generated through the various iterations are saved to the antenna repository, and finally a report and the results are presented to the user. While FIG. 11 illustrates the process being performed through a web portal, the automated antenna building process (with or without querying of the repository) can be performed via a plug-in in third party applications, or via the antenna builder interface described above.

In embodiments described herein, the user requirements provided by the user can be used in combination with a library of antenna design rules to create antenna designs that best meet a set of conditions, such as the user requirements. The library or set of antenna design rules can also be used to create antenna designs that fit the available area/volume. For example, the user can submit a PCB CAD drawing, a 3D CAD drawing, or some other image indicating the available area or volume where an antenna design is to fit within a device. This user requirement is then treated as a set of conditions. The library of antenna technology design rules inside the repository database then guides a sort of AI engine to automatically synthesize a custom antenna that will fit within the available area/volume, i.e., meet the set of conditions. Naturally, many other conditions could be included in the set of conditions, with these conditions including the type of antenna to be designed and other depending on the type of antenna to be designed. For example, the set of conditions can include at least one of the following conditions: antenna type, antenna category, antenna shape, antenna area, antenna length, antenna volume, antenna efficiency, antenna electrical properties, antenna coupling properties, and element types included in the antenna.

In each case, the set of design rules will match or modify antenna segments that are configured to physically implement the set of conditions. For example, in the case of CPL antennas, the set of design rules may indicate that for single frequency applications, only one magnetic loop is needed, but for dual band applications, one magnetic loop is needed with a “bend” located somewhere in the magnetic loop (enabling the optimizer to vary the location of the bend until the set of conditions is satisfied), while an electric field radiator may be located on any segment where it does not run into another antenna segment (enabling the optimizer to change the angle or position of the electric field radiator). Thus, both embodiments of the antenna builder and the method of automated antenna generation can use logic associated with antenna segments, custom logic written by a user, the library or set of design rules, and a set of conditions to explore various antenna designs. The logic and the set of design rules can be part of external libraries dynamically loaded, or they can be stored in the antenna repository.

The following paragraphs are provided to illustrate further embodiments taught by the present disclosure; embodiments that are also described in commonly assigned U.S. patent application Ser. No. 13/234,063:

A computer-implemented method for building an antenna, comprising the steps of: drawing two or more antenna segments, the two or more antenna segments forming an antenna structure; associating one or more properties to one or more antenna segments among the two or more antenna segments, the one or more properties based on a type of the antenna; associating logic to one or more antenna segments among the two or more antenna segments, the logic based on the type of the antenna and defining a set of relationships between at least a first antenna segment among the two or more antenna segments and one or more other antenna segments among the two or more antenna segments; and generating an antenna output including the two or more antenna segments, the one or more properties, and the logic, the antenna output having a format that can be used by a third party application.

The method as recited above, further comprising the step of performing an electromagnetic simulation of the antenna structure.

The method as recited above, wherein the electromagnetic simulation is performed by the third party application.

The method as recited above, further comprising the step of optimizing one or more criteria associated with the antenna structure using an optimizer, the optimizer running over a plurality of iterations and using the logic to make adjustments to the two or more antenna segments, each iteration among the plurality of iterations generating at least one potential antenna design.

The method as recited above, wherein the step of optimizing is performed by the third party application.

The method as recited above, wherein the step of optimizing includes the steps of: querying an antenna repository to retrieve a set of antennas similar to the antenna structure; and seeding the optimizer with the set of antennas similar to the antenna structure.

The method as recited above, further comprising the step of saving the at least one potential design to the antenna repository if the at least one potential design meets a set of conditions.

The method as recited above, wherein the set of conditions includes at least one condition based upon one or more selected from the group comprising: antenna type, antenna category, antenna shape, antenna area, antenna length, antenna volume, antenna efficiency, antenna electrical properties, antenna coupling properties, and element types included in the antenna.

The method as recited above, wherein the antenna output is comprised of a drawing data output and an antenna logic output, the drawing data output including drawing data associated with the antenna structure, and the antenna logic output including the one or more properties and the logic.

The method as recited above, wherein the one or more properties include an expose parameter indicating to an optimizer that a value of a property among the one or more properties can be changed during an optimization run.

The method as recited above, wherein the logic further includes a valid value range associated with the value of the property, the valid value range indicating a set of valid values for the property and a set of invalid values for the property.

The method as recited above, wherein the logic updates a value of a parameter of the first antenna segment based on the one or more properties of the one or more other antenna segments.

The method as recited above, wherein the logic updates a size of the first antenna segment based on the one or more properties of the one or more other antenna segments.

The method as recited above, wherein the logic updates a position of the first antenna segment based on the one or more properties of the one or more other antenna segments.

The method as recited above, wherein the logic defines a range of valid values for a parameter among the one or more properties used by an optimizer to make adjustments to the two or more antenna segments.

The method as recited above, wherein the logic defines a set of allowed physical adjustments to the two or more antenna segments.

The method as recited above, wherein the logic defines one or more connection points between the first antenna segment and the one or more other antenna segments.

The method as recited above, further comprising the step of accepting a custom logic from a user defining a custom set of relationships between at least the first segment and the one or more other antenna segments.

A method of creating an antenna, comprising: building an antenna according to the method recited in any preceding paragraphs; and creating an antenna based upon the antenna output.

An antenna made using an antenna output provided by the method recited above.

A computer program comprising computer implementable instructions to cause a programmable computer to become configured to carry out the method recited above.

A computer-implemented method for generating an antenna design, comprising the steps of: accepting from a user a set of requirements associated with a desired antenna structure of the antenna design; searching an antenna repository for a set of prior antenna designs that meet at least one requirement among the set of requirements; seeding an optimization run with the set of prior antenna designs; performing the optimization run over a plurality of iterations, each iteration among the plurality of iterations generating at least one potential design; saving the at least one potential design to the antenna repository if the at least one potential design meets a set of conditions; outputting one or more final antenna designs at the end of the optimization run; and using the at least one potential design saved in the antenna repository for one or more future optimization runs.

The method as recited above, wherein the antenna repository includes a plurality of antennas created with a third party application.

The method as recited above, wherein the step of seeding an optimization run includes the step of seeding the optimization run with randomly created antenna designs in combination with the set of prior antenna designs.

The method as recited above, wherein the step of seeding an optimization run includes the steps of: automatically generating an initial antenna design based on the set of requirements; and seeding the optimization run with the initial antenna design.

The method as recited above, wherein the set of requirements include at least one of material requirements, electrical requirements, and electromagnetic requirements.

The method as recited above, wherein the set of requirements include a type of application for the antenna design.

The method as recited above, wherein the step of accepting from a user a set of requirements includes the steps of: accepting from the user a volume data defining an available volume for the antenna design; and analyzing the volume data and determining a volume requirement.

The method as recited above, wherein the volume data includes a 3D CAD data or a PCB CAD data.

The method as recited above, wherein the step of performing the optimization run includes the step of using a set of design rules to generate the at least one potential design having a physical shape fitting within the available volume for the antenna design and maximizing the set of requirements met, the set of design rules specifying relationships between a set of conditions and antenna segments configurable to implement the set of conditions.

The method as recited above, wherein the set of requirements further include a target antenna architecture.

The method as recited above, wherein the step of accepting from the user the set of requirements includes the steps of: accepting from the user a first set of requirements; and automatically determining the target antenna architecture based on the first set of requirements.

The method as recited above, wherein the step of accepting from the user the set of requirements includes the steps of: accepting from the user a first set of requirements; and accepting from the user the target antenna architecture.

The method as recited above, wherein the step of searching an antenna repository includes the step of searching the antenna repository for antenna designs belonging to the target antenna architecture.

The method as recited above, wherein the step of performing the optimization run includes the step of generating potential designs belonging to the antenna architecture.

The method as recited above, wherein the step of searching an antenna repository includes the steps of: displaying to the user the set of prior antenna designs; enabling the user to select one or more seeding antenna designs from the set of prior antenna designs; and replacing the set of prior antenna designs with the one or more seeding antenna designs.

The method as recited above, wherein the set of conditions includes at least one condition based upon one or more selected from the group comprising: antenna type, antenna category, antenna shape, antenna area, antenna length, antenna volume, antenna efficiency, antenna electrical properties, antenna coupling properties, and element types included in the antenna.

The method as recited above, further comprising the step of accepting from the user a logic used during the optimization run to generate the at least one potential designs.

The method as recited above, wherein the step of performing the optimization run includes the step of using a set of design rules to generate the at least one potential design, the set of design rules specifying relationships between a set of conditions and antenna segments configurable to implement the set of conditions.

The method as recited above, wherein the set of design rules are stored in the antenna repository.

A computer-implemented method of generating an antenna design, comprising the steps of: accepting from a user volume data defining an available volume for the desired antenna design; accepting from a user a set of requirements associated with the desired antenna structure associated with the desired antenna design; analyzing the available volume and determining a volume requirement; searching an antenna repository having a plurality of antenna designs using the set of requirements and the volume requirement, the searching generating a seeding set including one or more antenna designs matching one or more requirements among set of requirements and the volume requirement; seeding an optimization run using the seeding set; performing the optimization run over a plurality of iterations, each iteration among the plurality of iterations generating at least one potential antenna design; saving the at least one potential antenna design to the antenna repository if the at least one potential antenna design meets a set of conditions; outputting one or more final antenna designs at an end of the optimization run; and using the at least one potential design saved in the antenna repository for one or more future optimization runs.

A method of creating an antenna, comprising: generating an antenna design according to the method recited above; and creating an antenna based upon the antenna design.

An antenna made using an antenna design provided by the method recited above.

A computer program comprising computer implementable instructions to cause a programmable computer to become configured to carry out the method recited above.

While the present disclosure illustrates and describes a preferred embodiment and several alternatives, it is to be understood that the techniques described herein can have a multitude of additional uses and applications. Accordingly, the invention should not be limited to just the particular description and various drawing figures contained in this specification that merely illustrate various embodiments and application of the principles of such embodiments.

What is claimed is:

1. A computer-implemented method for building an antenna, comprising the steps of:

receiving as input from a user, instructions for drawing two or more antenna segments, the two or more antenna segments forming an antenna structure;

receiving as input from a user, instructions for associating one or more properties to one or more antenna segments among the two or more antenna segments, the one or more properties based on a type of the antenna;

receiving as input from a user, instructions for associating logic to one or more antenna segments among the two or more antenna segments, the logic based on the type of the antenna, defining a first set of relationships between at least a first antenna segment among the two or more antenna segments and one or more other antenna segments among the two or more antenna segments, and defining a second set of relationships between the two or more antenna segments and a type of device in which the antenna will be installed, the instructions further specifying a set of conditions that include an antenna volume for the type of device in which the antenna is to be installed; and generating an antenna output data file including information defining the two or more antenna segments, the one or more properties, and the logic, the antenna output data file having a format that can be used by a third party application.

2. The method as recited in claim 1, further comprising the step of receiving as input from a user, instructions for performing an electromagnetic simulation of the antenna structure.

3. The method as recited in claim 2, wherein the electromagnetic simulation is performed by the third party application.

4. The method as recited in claim 1, further comprising the step of receiving as input from a user, instructions for optimizing one or more criteria associated with the antenna structure using an optimizer, the optimizer running over a plurality of iterations and using the logic to make adjustments to the two or more antenna segments, each iteration among the plurality of iterations generating at least one potential antenna design.

5. The method as recited in claim 4, wherein the step of optimizing is performed by the third party application.

6. The method as recited in claim 4, wherein the step of optimizing includes the steps of:

querying an antenna repository to retrieve a set of antennas that meet at least a user requirement; and seeding the optimizer with the set of antennas that meet at least the user requirement.

7. The method as recited in claim 6, further comprising the step of receiving as input from a user, instructions for saving the at least one potential design to the antenna repository if the at least one potential antenna design meets the set of conditions.

8. The method as recited in claim 7, wherein the set of conditions includes one or more of an antenna type, an antenna category, an antenna shape, an antenna area, an antenna length, an antenna efficiency, antenna electrical properties, antenna coupling properties, and element types included in the antenna.

9. The method as recited in claim 1, wherein the antenna output data file is comprised of a drawing data output data file and an antenna logic output data file, the drawing data output data file including drawing data associated with the antenna structure, and the antenna logic output data file including the one or more properties and the logic.

10. The method as recited in claim 1, wherein the one or more properties include an expose parameter indicating to an optimizer that a value of a property among the one or more properties can be changed during an optimization run.

11. The method as recited in claim 10, wherein the logic further includes a valid value range associated with the value of the property, the valid value range indicating a set of valid values for the property and a set of invalid values for the property.

12. The method as recited in claim 1, wherein the logic updates a value of a parameter of the first antenna segment based on the one or more properties of the one or more other antenna segments.

13. The method as recited in claim 1, wherein the logic updates a size of the first antenna segment based on the one or more properties of the one or more other antenna segments.

14. The method as recited in claim 1, wherein the logic updates a position of the first antenna segment based on the one or more properties of the one or more other antenna segments.

15. The method as recited in claim 1, wherein the logic defines a range of valid values for a parameter among the one or more properties used by an optimizer to make adjustments to the two or more antenna segments.

16. The method as recited in claim 1, wherein the logic defines a set of allowed physical adjustments to the two or more antenna segments.

17. The method as recited in claim 1, wherein the logic defines one or more connection points between the first antenna segment and the one or more other antenna segments.

18. The method as recited in claim 1, further comprising the step of receiving as input from a user, instructions for accepting a custom logic from a user defining a custom set of relationships between at least the first segment and the one or more other antenna segments.

19. The method as recited in claim 1, further comprising the step of receiving as input from a user, instructions for creating an antenna based upon the antenna output data file.

20. The method as recited in claim 1, further comprising the steps of:

determining whether the antenna output data file meets one or more design rules;

when the antenna output data file fails to meet the one or more design rules, modifying the antenna output data file to meet the design rules and seeding an optimizer with the modified antenna output data file; and running the optimizer over a plurality of iterations to optimize one or more criteria of the modified antenna output data file.

21. The method as recited in claim 20, wherein:

when the antenna output data file meets the one or more design rules, seeding the optimizer with the antenna output data file; and running the optimizer over a plurality of iterations to optimize one or more criteria of the antenna output data file.

22. A non-transitory computer readable storage medium comprising instructions that, upon execution on a computing device, cause the computing device to perform at least the steps of:

drawing two or more antenna segments received as input received from a user, the two or more antenna segments representing an antenna structure;

associating one or more properties received as input received from a user to one or more antenna segments among the two or more antenna segments, the one or more properties being automatically associated to the one or more antenna segments based on a type of an antenna selected from a plurality of types of the antenna;

associating logic received as input received from a user to one or more antenna segments among the two or more antenna segments, the logic being automatically associated to the one or more antenna segments based on the type of the antenna selected from the plurality of types of the antenna, the logic comprising a first set of relationships configured to define one or more connection points between at least a first antenna segment among the two or more antenna segments and one or more other antenna segments among the two or more antenna segments, and defining a second set of relationships between the two or more antenna segments and a type of a device in which the antenna will be installed, the input from the user further specifying a set of conditions that include an antenna volume for the type of device in which the antenna is to be installed; and generating an antenna output data file including information defining the two or more antenna segments, the one or more properties, and the logic, the antenna output data file having a format that can be used by a third party application and comprising a first data set representing the two or more antenna segments and a second data set representing the one or more properties and the logic, the first data set and the second data set being decoupled, the first data set being configured to allow the third party application to render an antenna design, the second data set being configured to allow the third party application to determine one or more operations available when changing data associated with one or more antenna segments of the two or more antenna segments.

* * * * *